(12) United States Patent
Tran

(10) Patent No.: US 6,868,865 B2
(45) Date of Patent: Mar. 22, 2005

(54) ROTARY DRAG VALVE

(75) Inventor: Duc Thanh Tran, Corona, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 0 days.

(21) Appl. No.: 10/410,218

(22) Filed: Apr. 9, 2003

(65) Prior Publication Data

US 2003/0192604 A1 Oct. 16, 2003

Related U.S. Application Data

(63) Continuation-in-part of application No. 10/282,667, filed on Oct. 29, 2002, which is a continuation-in-part of application No. 10/198,970, filed on Jul. 19, 2002, which is a continuation-in-part of application No. 10/122,276, filed on Apr. 12, 2002.

(51) Int. Cl.[7] .................................................. F16K 5/08
(52) U.S. Cl. ............................................. 137/625.32
(58) Field of Search ........................ 137/625.3, 625.32, 137/625.33; 251/118

(56) References Cited

U.S. PATENT DOCUMENTS

| | | | |
|---|---|---|---|
| 3,880,191 A | * 4/1975 | Baumann | 137/625.32 |
| 4,540,025 A | * 9/1985 | Ledeen et al. | 137/625.32 |
| 4,665,946 A | 5/1987 | Hulsey | |
| 5,218,984 A | * 6/1993 | Allen | 137/1 |
| 5,509,446 A | * 4/1996 | Bey | 137/625.32 |
| 5,680,889 A | * 10/1997 | Boger | 137/625.32 |
| 5,758,689 A | * 6/1998 | Leinen | 137/625.32 |
| 5,771,929 A | * 6/1998 | Boger | 137/625.32 |
| 5,937,901 A | 8/1999 | Bey | |

* cited by examiner

Primary Examiner—John Fox
(74) Attorney, Agent, or Firm—Stetina Brunda Garred & Brucker

(57) ABSTRACT

A valve assembly comprising a rotary closure element which defines an axis of rotation and is selectively movable between a fully open position and a fully closed position. Mounted to and movable with the rotary closure element is an impedance assembly. The impedance assembly defines an inflow end and an outflow end, and comprises a plurality of fluid passageways of varying noise attenuating capability which extend from the inflow end to the outflow end. Also partially defined by the impedance assembly is a flow opening which extends from the inflow end to the outflow end.

12 Claims, 26 Drawing Sheets

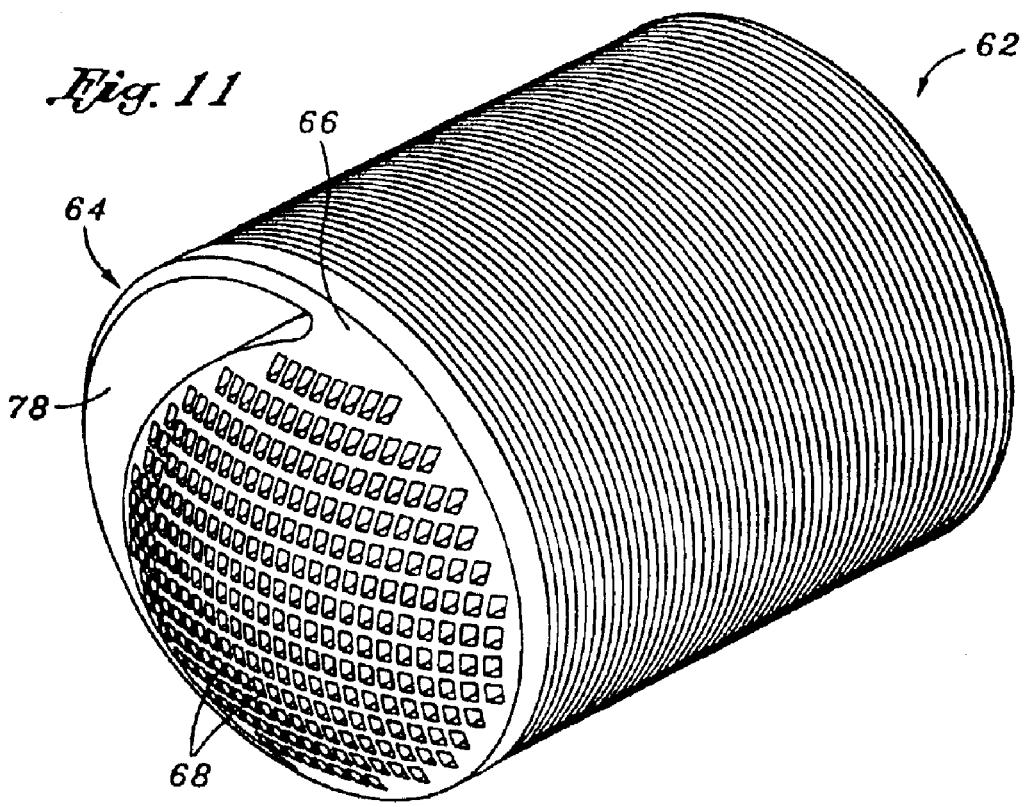
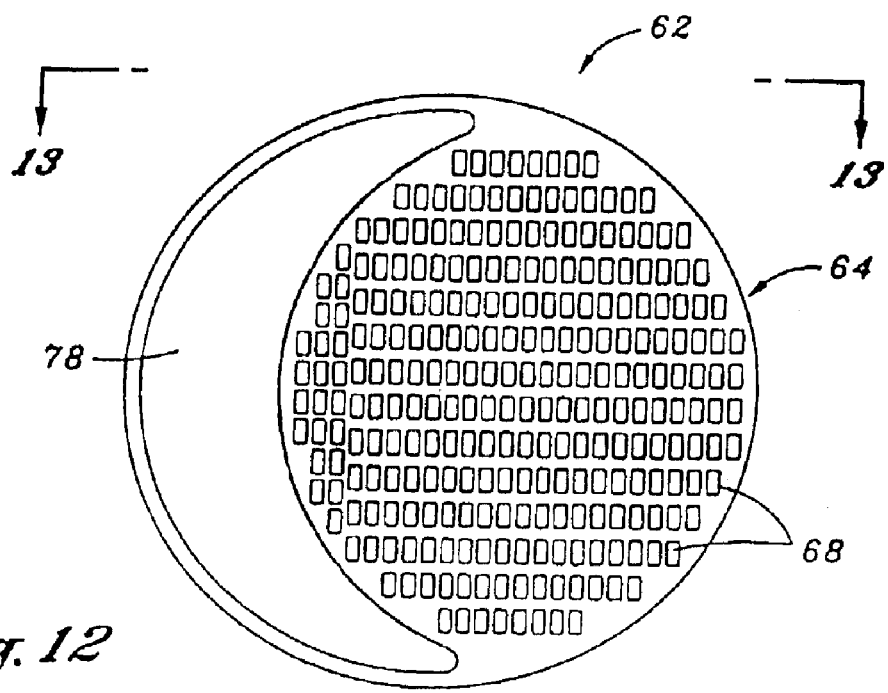

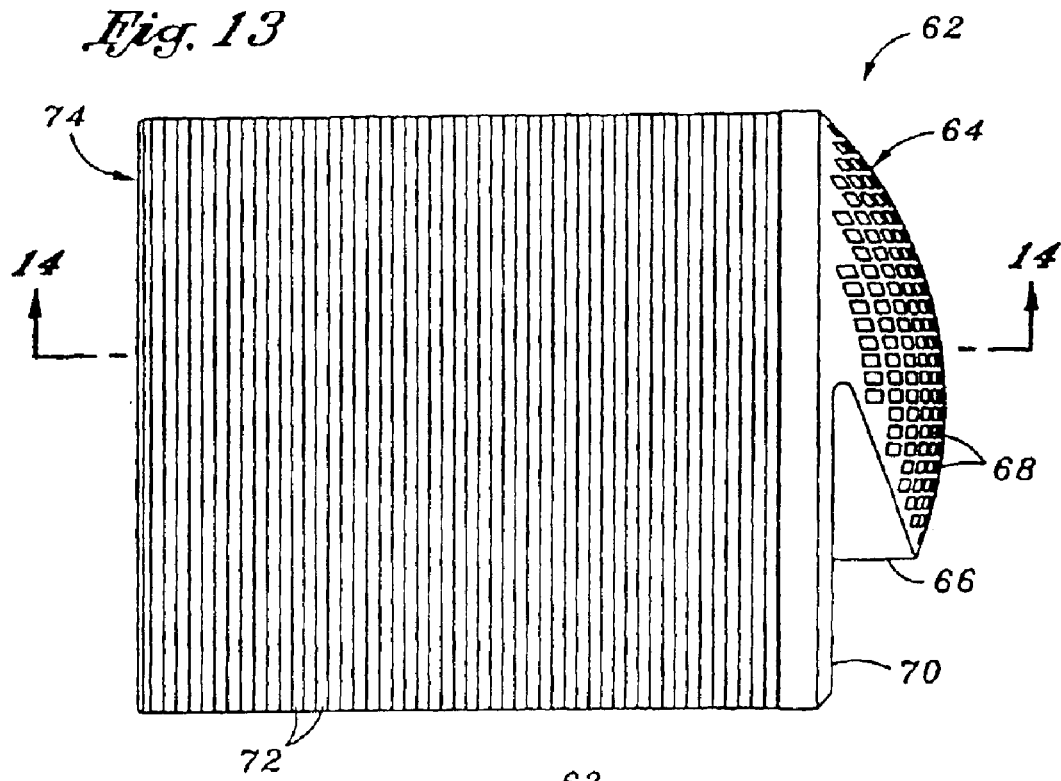
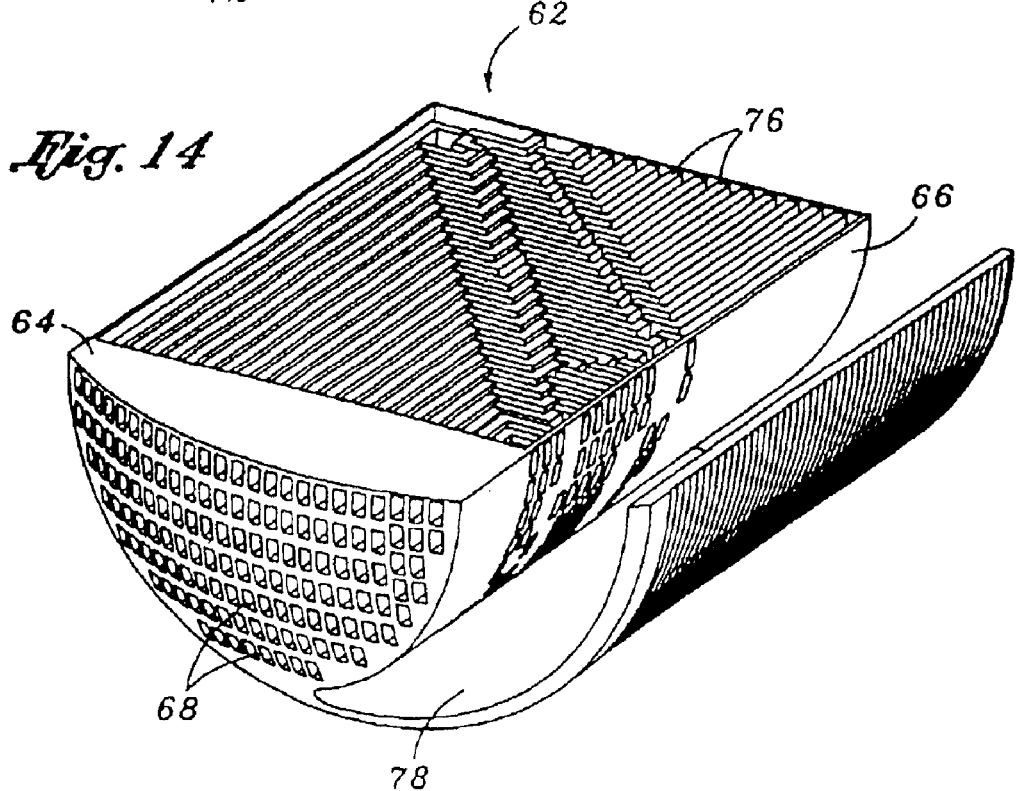

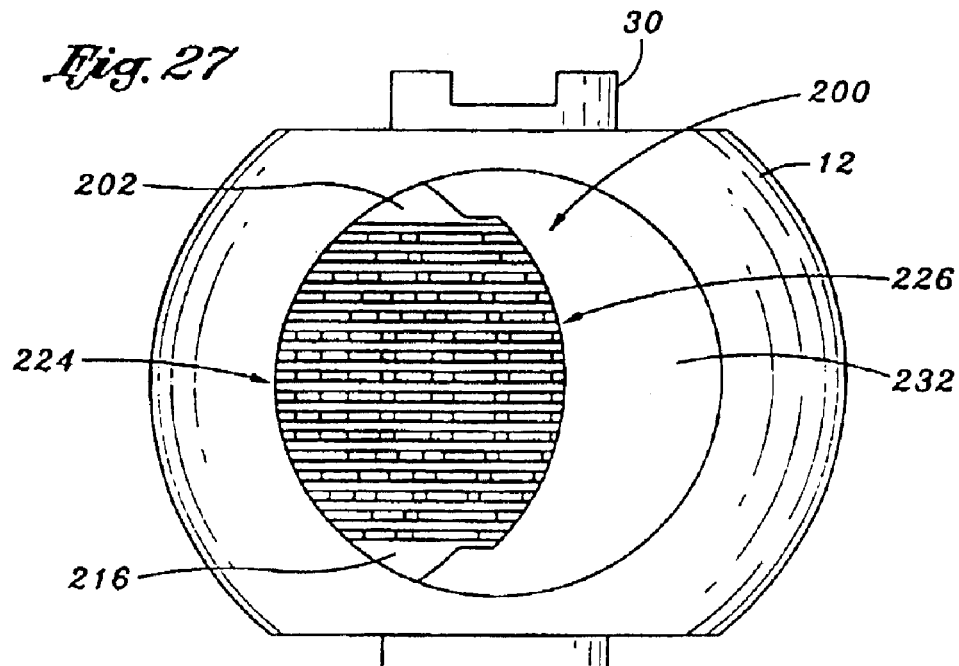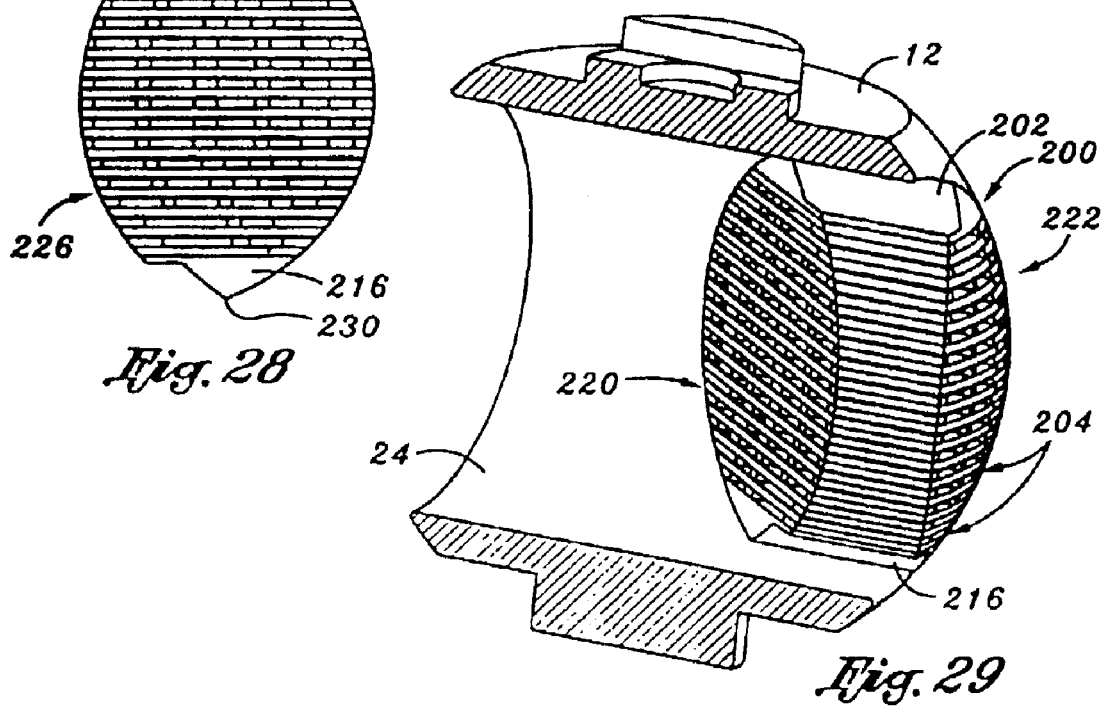

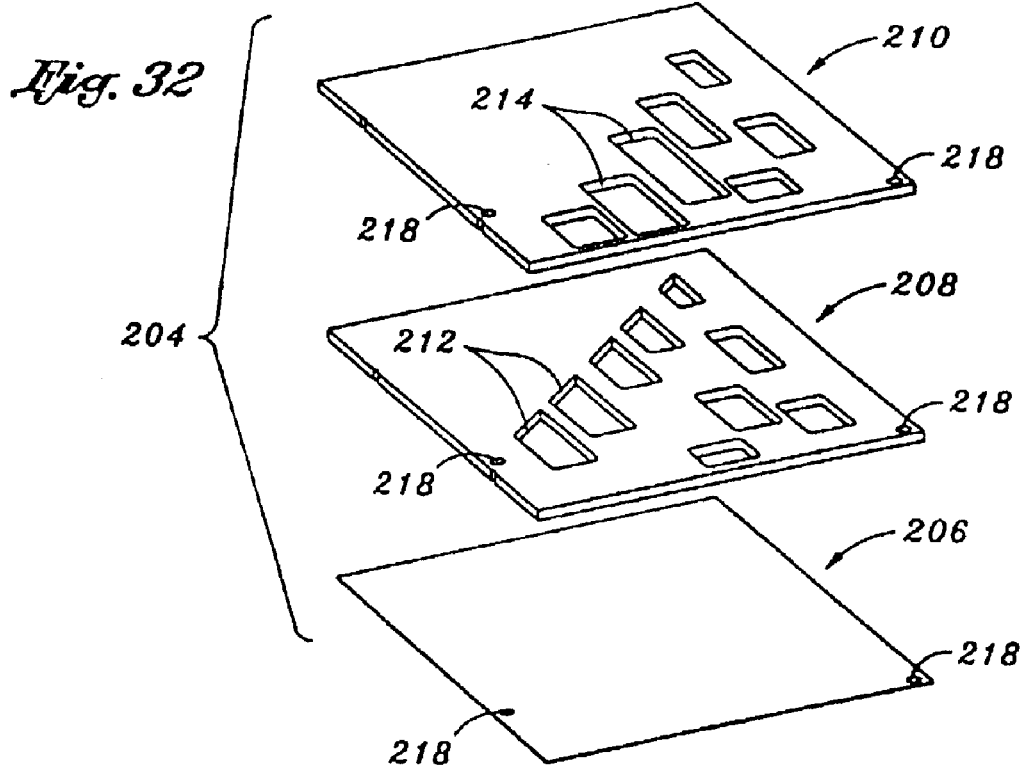
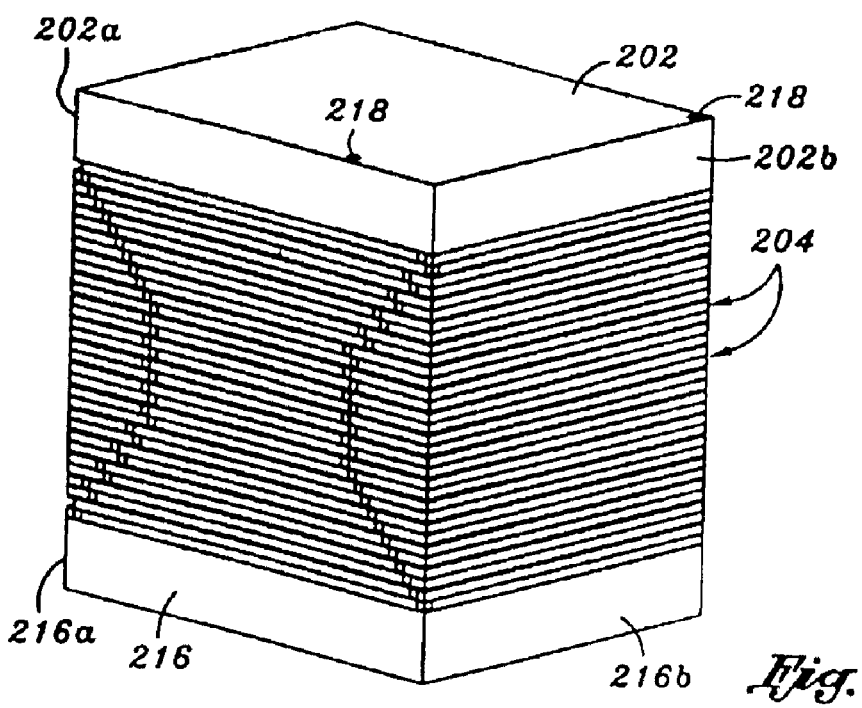
Fig. 32
Fig. 31

ROTARY DRAG VALVE

CROSS-REFERENCE TO RELATED APPLICATIONS

The present application is a continuation-in-part of U.S. application Ser. No. 10/282,667 entitled ROTARY DRAG VALVE filed Oct. 29, 2002, which is a continuation-in-part of U.S. application Ser. No. 10/198,970 entitled ROTARY DRAG VALVE filed Jul. 19, 2002, which is a continuation-in-part of U.S. application Ser. No. 10/122,276 entitled DRAG BALL VALVE filed Apr. 12, 2002.

STATEMENT RE: FEDERALLY SPONSORED RESEARCH/DEVELOPMENT (Not Applicable)

BACKGROUND OF THE INVENTION

1. Field of the Invention

The present invention relates generally to rotary valves, and more particularly to an energy attenuating ball valve which includes an impedance assembly mounted within and movable with the closure element or "ball" of the ball valve.

2. Discussion of Background

There is currently known in the prior art linear valve assemblies which are outfitted to include a noise attenuation or impedance assembly. Such valves are often referred to in the relevant industry as "drag valves". Linear valves as currently known in the prior art typically include an annular impedance assembly which includes a plurality of annular disks which each define a plurality of radially extending, tortuous flow passages and are secured to each other in a stacked arrangement. Disposed within the interior of the impedance assembly is a piston which is cooperatively engaged to an actuator operative to facilitate the reciprocal movement of the piston within the impedance assembly. When the piston is in a lowermost position, none of the passages of the impedance assembly are exposed to an incoming flow. As the piston is moved upwardly toward an open position, flow passes through the passages of the impedance assembly to provide an exit flow through the linear valve. The amount of flow through the impedance assembly is varied by the position of the piston, which in turn varies the area or proportion of the impedance assembly exposed to the incoming flow within the interior thereof.

Though the above-described linear valve arrangement provides significant noise reduction capabilities, in certain applications it is often desirable to employ the use of a rotary valve utilizing a rotary closure element as an alternative to a linear valve. Since currently known linear impedance valves are typically considered to provide superior noise reduction capabilities as compared to rotary valves, the present invention addresses this disparity by providing a rotary valve arrangement which retains the benefits of the impedance assembly associated with linear valves, while still employing the use of a rotary closure element. As will be discussed in more detail below, in the present invention, the impedance assembly is carried by the rotary closure element of the rotary or ball valve which may be adapted for use in large, high capacity applications for which an equivalent linear valve would be excessively expensive (attributable to manufacturing obstacles) and potentially susceptible to instability problems. These, and other advantages of the present invention, will be discussed in more detail below.

BRIEF SUMMARY OF THE INVENTION

In accordance with the present invention, there is provided a valve assembly comprising a rotary closure element defining an axis of rotation and selectively movable between a fully open position and a fully closed position. Mounted to and movable within the rotary closure element is an impedance assembly. The impedance assembly defines an inflow end and an outflow end, and comprises a plurality of fluid passageways of varying noise attenuating capability which extend from the inflow end to the outflow end. The impedance assembly also partially defines a flow opening which extends through at least a portion of the bore of the rotary closure element into which the impedance assembly is mounted. The fluid passageways and such flow opening are oriented relative to each other such that a portion of flow through the valve assembly is directed into the fluid passageways, with a portion of the flow being directed through the flow opening when the closure element is in its fully open position.

The fluid passageways may be disposed, in their entirety, downstream of the axis of rotation of the closure element when the same is in its fully open position. Alternatively, the impendence assembly may be formed such that certain ones of the fluid passageways are disposed in their entirety downstream of the axis of rotation of the closure element when the same is in its fully open position, with certain ones of the fluid passageways including portions or segments which extend upstream and downstream of the axis of rotation when the closure element is in its fully open position. The fluid passageways may each be tortuous, defining a series of turns which extend at generally right angles relative to each other, with such tortuous fluid passageways defining differing numbers of turns.

The impedance assembly is interfaced to the rotary closure element such that flow through the valve assembly is applied initially to the fluid passageways having a greater number of turns when the closure element is moved from its fully closed position toward its fully open position.

The impedance assembly comprises a series of plates which are secured to each other in a stacked arrangement. Each of the plates includes a plurality of flow passages (e.g., slots, openings, etc.) formed therein which collectively define the fluid passageways when the plates are stacked upon each other. The plates are stacked so as to extend along an axis which is generally perpendicular or normal to the axis of the bore (i.e., extends in generally parallel relation to the axis of rotation of the closure element). The surfaces of the plates collectively defining the inflow end of the impedance assembly are preferably beveled so as to extend at an acute angle relative to the axis of the bore. The surfaces of the plates collectively defining the outflow end of the impedance assembly are preferably arcuately contoured so as to extend in substantially flush or continuous relation to the outer surface of the generally spherical closure element.

Further in accordance with the present invention, it is contemplated that a pair of impedance assemblies may be mounted within the bore of the rotary closure element in spaced relation to each other, and thus concurrently movable with the rotary closure element. The fluid passageways of the front or upstream impedance assembly may be disposed in their entirety upstream of the axis of rotation of the closure element when the same is in its fully open position, with the fluid passageways of the rear or downstream impedance assembly being disposed in their entirety downstream of the axis of rotation of the closure element when the same is in its fully open position. However, similar to prior embodiments, portions of the fluid passageways of the upstream impedance assembly may extend downstream of the axis of rotation, with portions of the fluid passageways of the downstream impedance assembly extending upstream of the axis of rotation. The upstream and downstream impedance assemblies and portions of the inner surface of the closure element defining the bore thereof collectively define a tortuous flow opening. It is further contemplated that any impedance assembly of the present invention constructed from a series of plates secured to each other in a stacked arrangement may include one or more bolts extending through the stack along an axis which is generally perpendicular or normal to the axis of rotation of the closure element, the bolt(s) being used to provide an increased level of structural integrity to the impedance assembly.

BRIEF DESCRIPTION OF THE DRAWINGS

These, as well as other features of the present invention, will become more apparent upon reference to the drawings wherein:

FIG. 11 is a front perspective view of the impedance assembly of the second embodiment;

FIG. 12 is a front elevational view of the impedance assembly of the second embodiment;

FIG. 13 is a side-elevational view of the impedance assembly of the second embodiment;

FIG. 14 is a cross-sectional view of the impedance assembly of the second embodiment;

FIG. 27 is a front elevational view of the closure element and impedance assembly of the fourth embodiment;

FIG. 28 is a rear elevational view of the impedance assembly of the fourth embodiment;

FIG. 29 is a cross-sectional view of the closure element taken from a rear perspective, illustrating the impedance assembly of the fourth embodiment as mounted within the bore of the closure element;

FIG. 31 is a rear perspective view of the impedance assembly of the fourth embodiment in a pre-machined configuration;

FIG. 32 is an exploded view of one of the disk assemblies of the impedance assembly of the fourth embodiment in a pre-machined configuration;

DETAILED DESCRIPTION OF THE INVENTION

Figure 1:
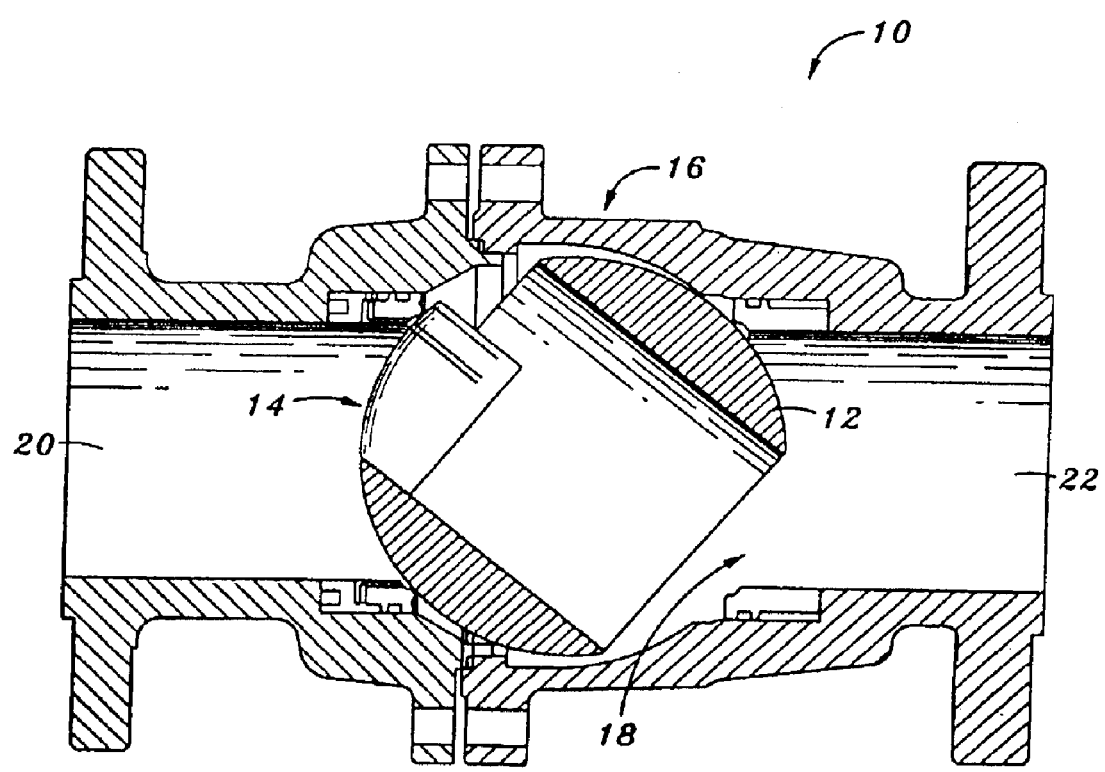
FIG. 1 is a cross-sectional view of an exemplary rotary valve having a closure element including an impedance assembly constructed in accordance with a first embodiment of the present invention.
Figure 4:
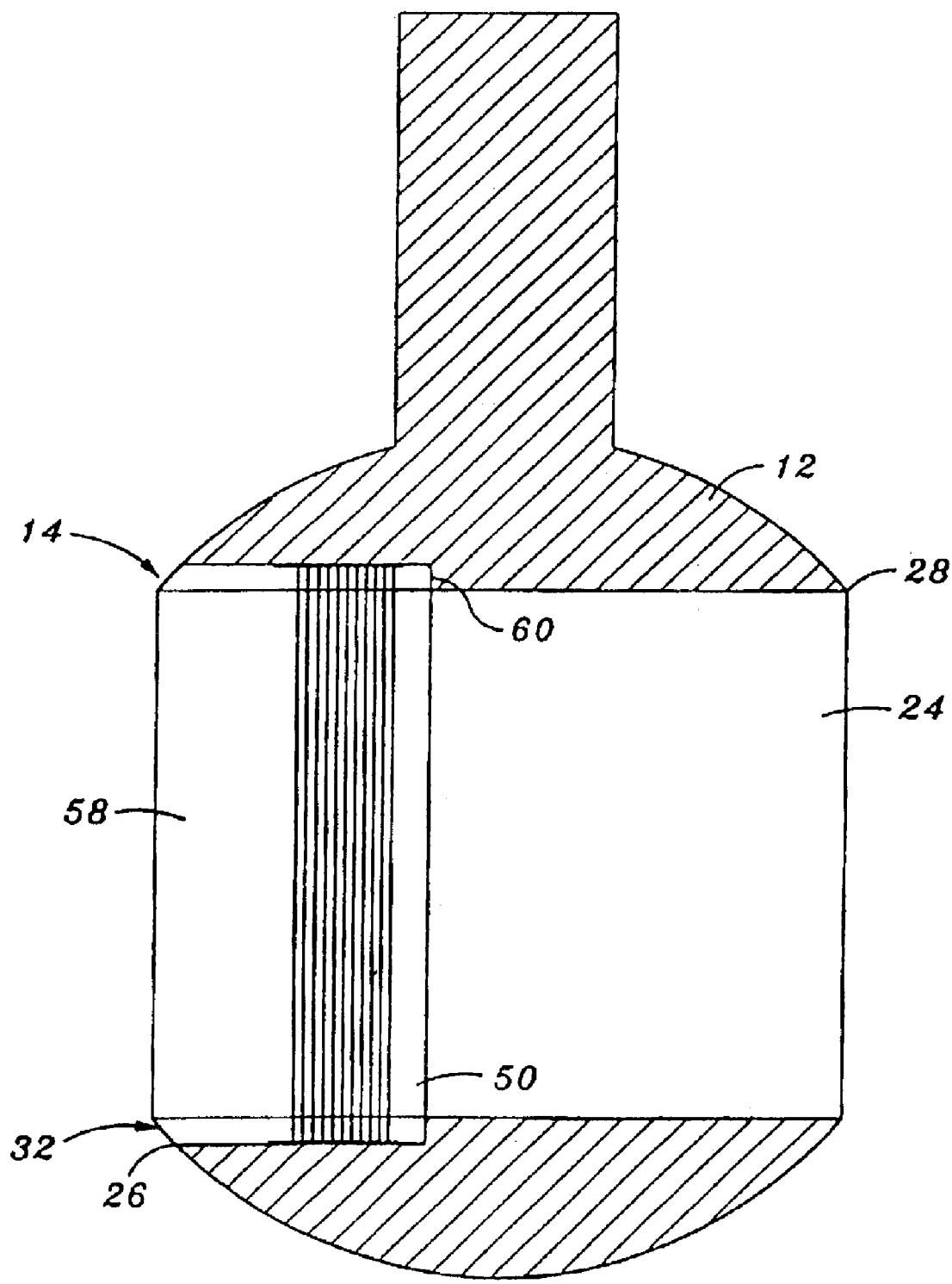
FIG. 4 is a cross-sectional view of the closure element and impedance assembly shown in FIGS. 2 and 3.
Figure 5:
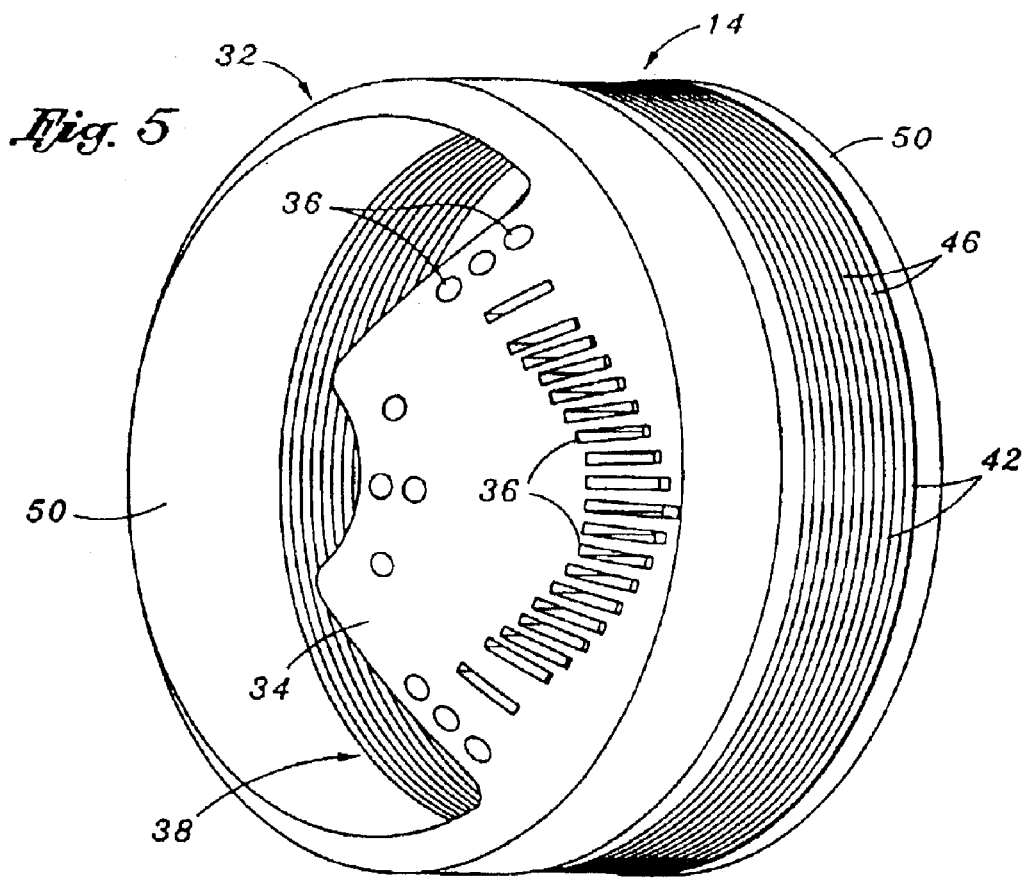
FIG. 5 is a front perspective view of the impedance assembly of the first embodiment.

Referring now to the drawings wherein the showings are for purposes of illustrating preferred embodiments of the present invention only, and not for purposes of limiting the same, FIG. 1 provides a cross-sectional view of a rotary valve 10 (e.g., a ball valve) having a rotary closure element 12 (e.g., a ball) outfitted to include an on-board impedance assembly 14 constructed in accordance with a first embodiment of the present invention. The valve 10 includes a housing 16 which defines a flow path 18 extending axially therethrough. The closure element 12 is operatively positioned within the flow path 18 of the housing 16, and effectively segregates the flow path 18 into an inflow section 20 and an outflow section 22. As best seen in FIG. 4, the closure element 12 defines a bore 24 which extends axially therethrough. The formation of the bore 24 within the closure element 12 truncates opposed ends of the closure element 12 which otherwise has a generally spherical shape. In this regard, the bore 24 includes an inflow end 26 and an outflow end 28 which are each defined by the closure element 12.

As further seen in FIG. 4, attached to the closure element 12 is a stem 30. The stem 30 extends radially from the closure element 12 in substantially perpendicular relation to the axis of the bore 24. In the valve 10, the closure element 12 is oriented within the flow path 18 such that the axis of the bore 24 is selectively placeable into coaxial alignment with the axis of the flow path 18, with the axis of the stem 30 extending in generally perpendicular relation to the axis of the flow path 18. In this regard, the actuation of the closure element 12 to a fully open position causes fluid flowing through the inflow section 20 of the flow path 18 to flow into the inflow end 26 of the bore 24 along the axis thereof and subsequently into the outflow section 22 of the flow path 18 via the outflow end 28 of the bore 24. When actuated to its fully closed position, the closure element 12 is rotated such that the axis of the bore 24 extends in generally perpendicular relation to the axis of the flow path 18, thus blocking the flow of fluid through the flow path 18 due to the impingement of the fluid flowing through the inflow section 20 against a side of the closure element 12.

As will be recognized, the closure element 12 may be rotated to various degrees of an open position between its fully open position and its fully closed position, i.e., the axis of the bore 24 may extend at an angle of between zero degrees and ninety degrees relative to the axis of the flow path 18. In FIG. 1, the closure element 12 is shown as being rotated into an orientation wherein the axis of the bore 24 extends at an angle of approximately forty-five degrees relative to the axis of the flow path 18, thus placing the valve 10 into a partially open state. Those of ordinary skill in the art will recognize that the structural attributes of the valve 10 are exemplary only, and that the impedance assembly 14 of the first embodiment of the present invention as will be described in more detail below may be employed in a multiplicity of differently configured rotary valves.

Referring now to FIGS. 2–8, there is shown the impedance assembly 14 which is constructed in accordance with the first embodiment of the present invention. As indicated above, the impedance assembly 14 is carried by the closure element 12, and more particularly is operatively positioned within the bore 24 in a manner which will be described in more detail below. As will also be discussed below, the structural attributes of the impedance assembly 14 allow the same to be retrofitted to the closure element 12 of an existing valve 10, or provided as an original component thereof.

Figure 2:
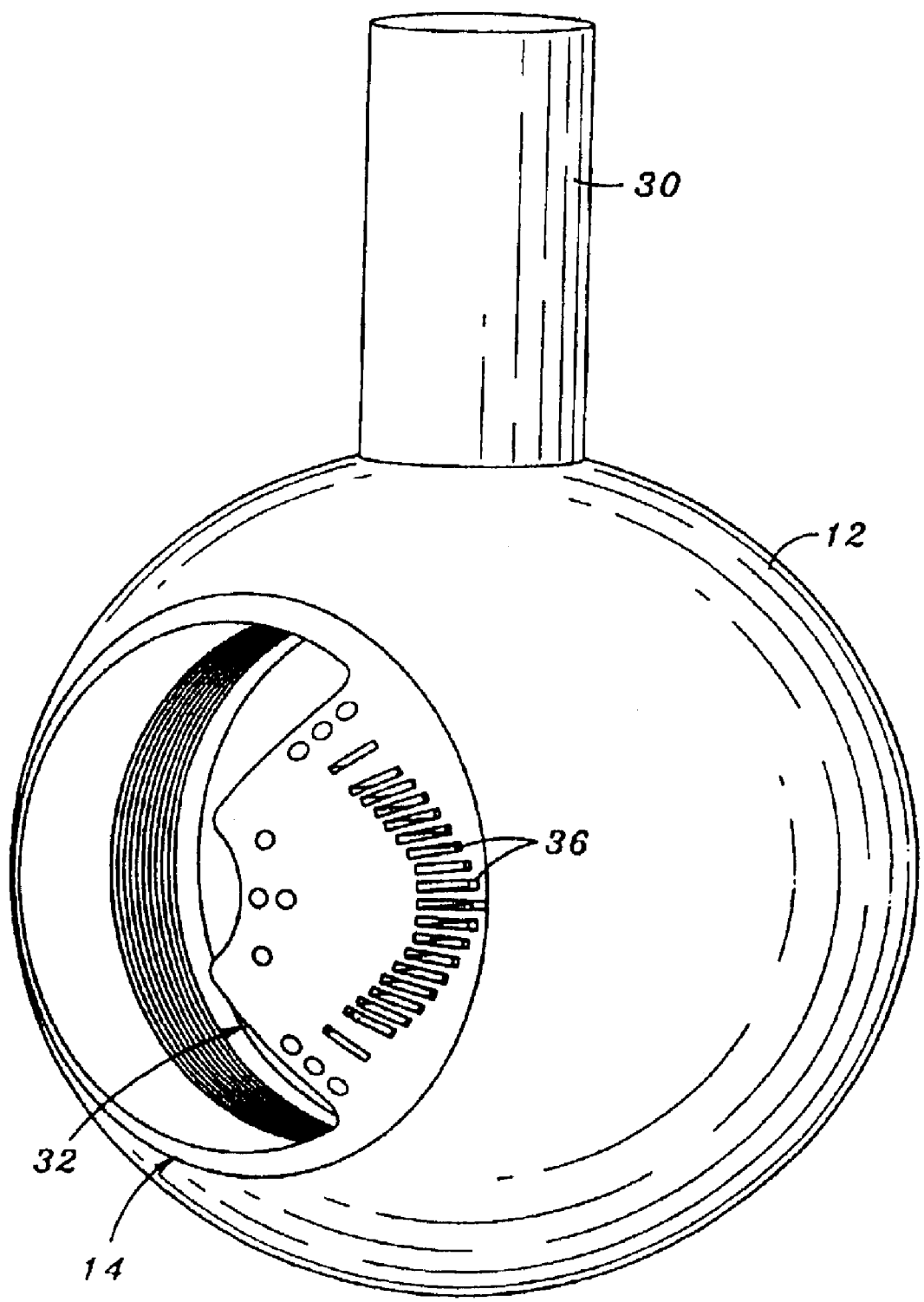
FIG. 2 is a front perspective view of the closure element and impedance assembly of the first embodiment shown in FIG. 1.
Figure 3:
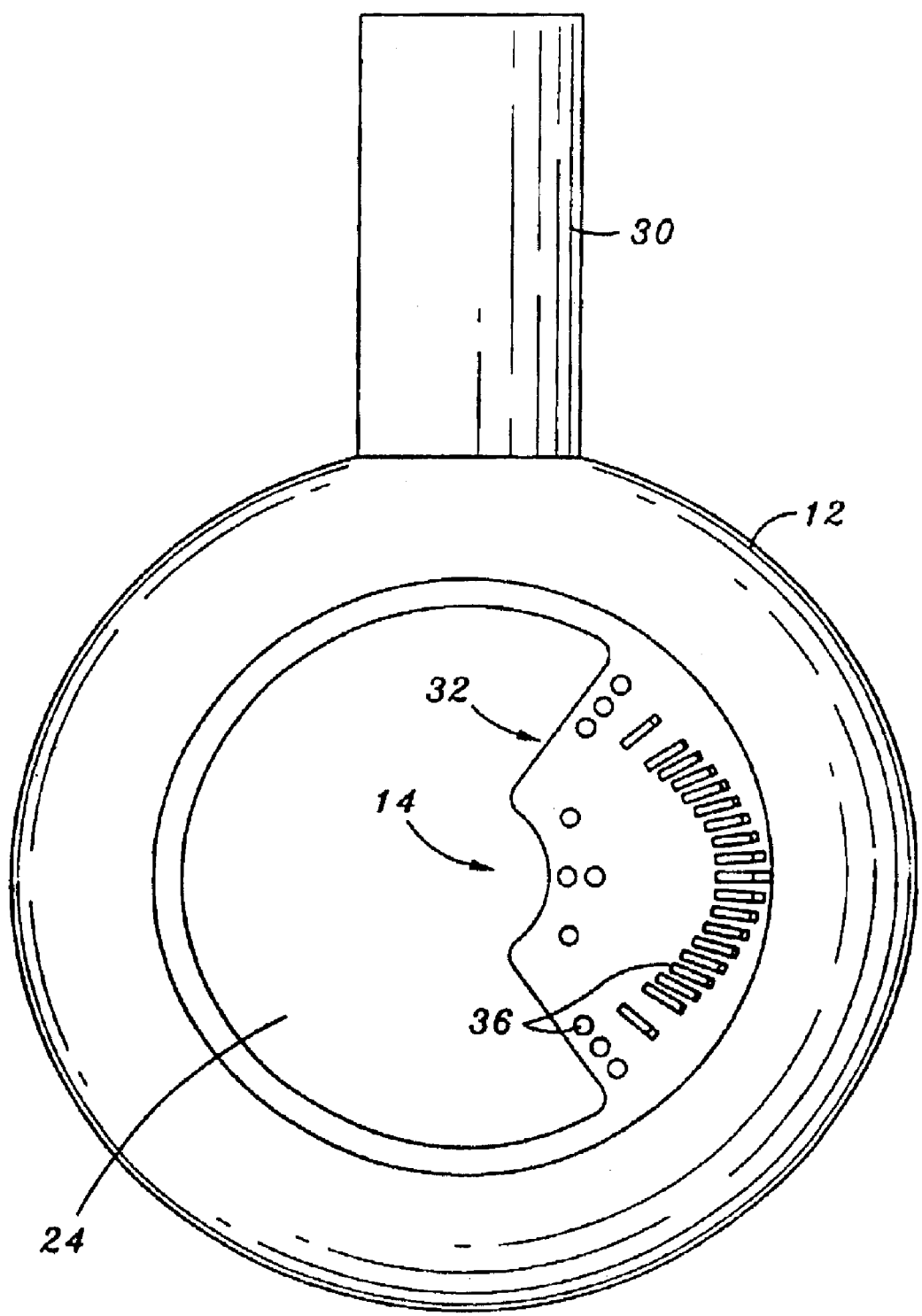
FIG. 3 is a front elevational view of the closure element and impedance assembly shown in FIG. 2.

The impedance assembly 14 comprises a cylindrically configured main feeder cap 32 which, in a preliminary, un-machined states, defines a generally planar outer surface 34 and an opposed, generally planar inner surface. Disposed within the main feeder cap 32 are a plurality of main feeder passages 36 which extend therethrough. The main feeder passages 36 are segregated into various sets, with one set of the main feeder passages 36 having elongate, slot-like configurations and being arranged in an arcuate pattern, and other sets of the main feeder passages 38 each having generally circular configurations. As seen in FIGS. 2 and 3, two sets of the circularly configured main feeder passages 36 are disposed at respective ones of the opposed ends of the arcuate set of elongate main feeder passages 36. Also disposed within the main feeder cap 32 is an enlarged opening 37.

Figure 7:
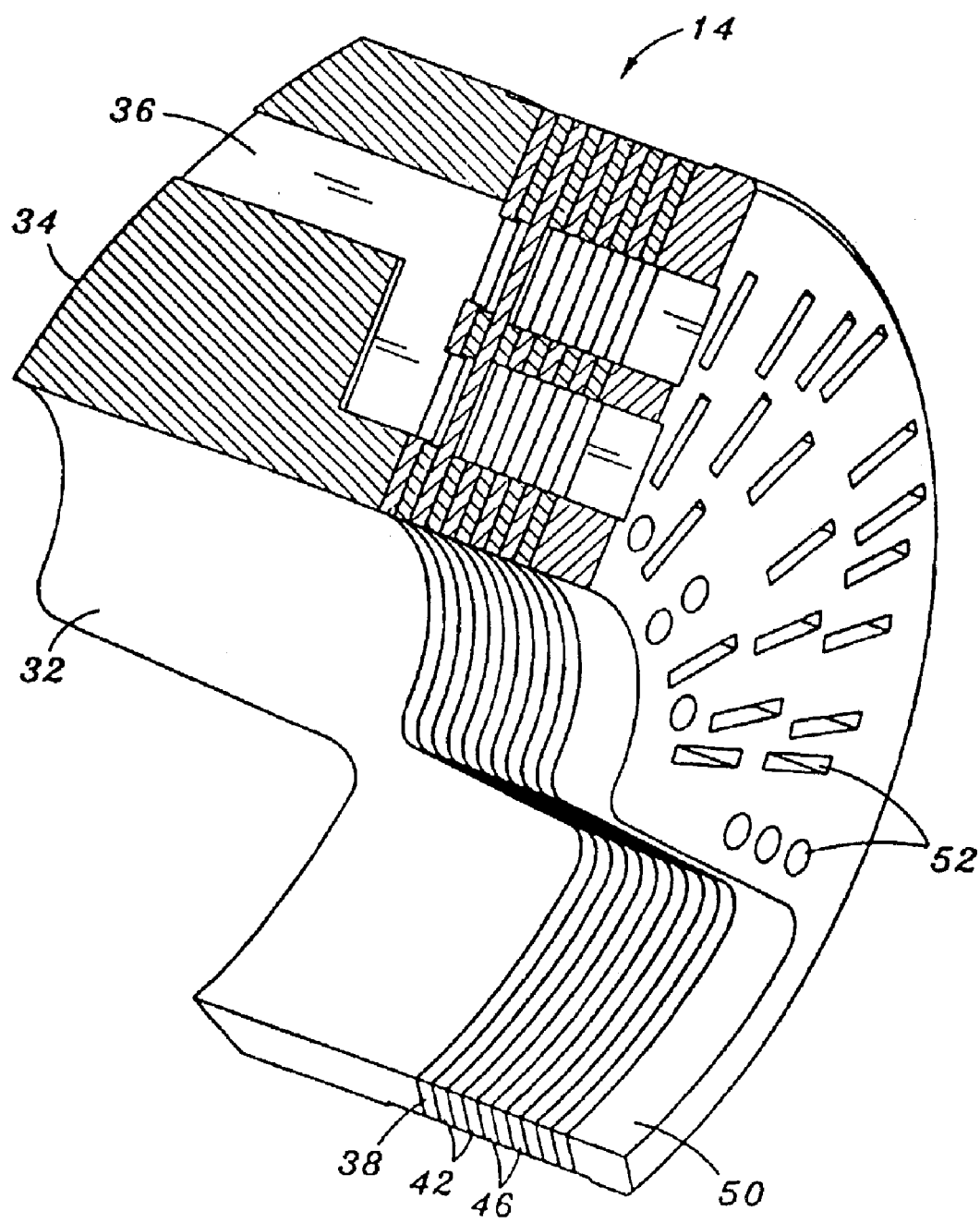
FIG. 7 is a cross-sectional view of the impedance assembly of the first embodiment.
Figure 8:
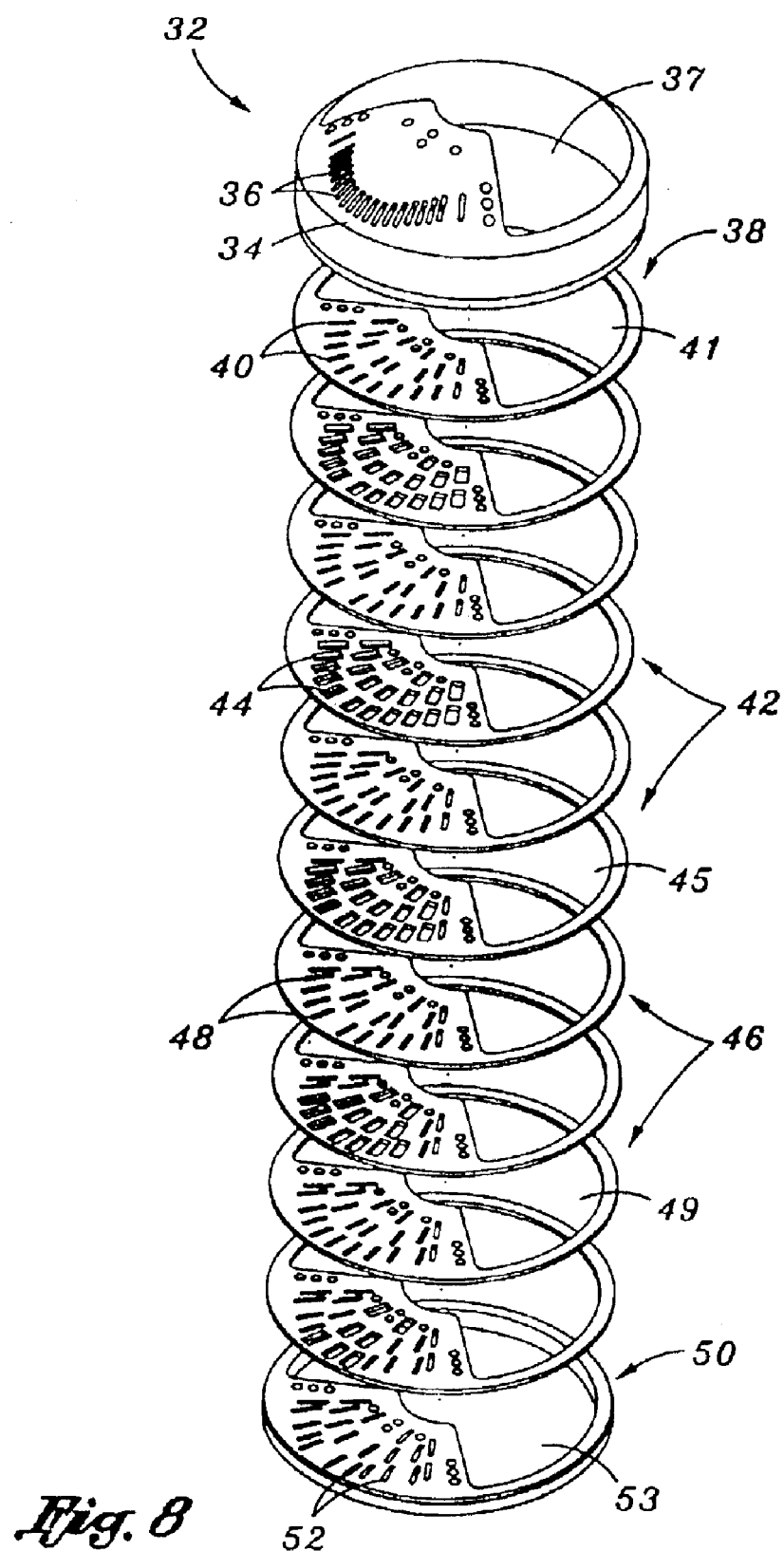
FIG. 8 is an exploded view of the impedance assembly of the first embodiment.
Figure 9:
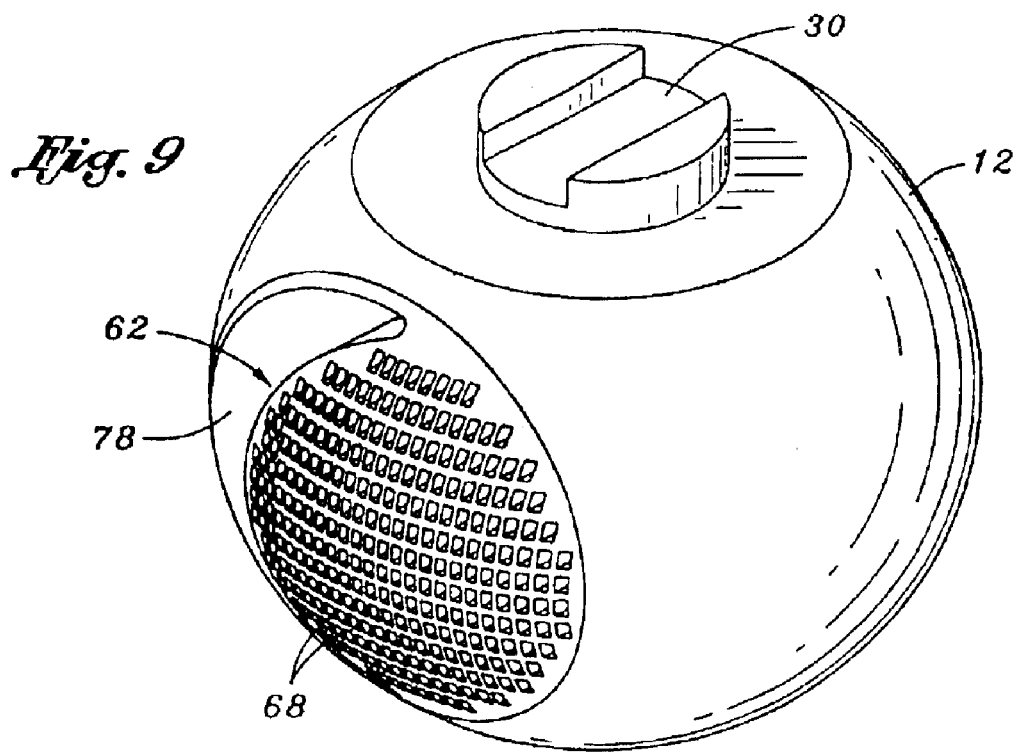
FIG. 9 is a front perspective view of a closure element including an impedance assembly constructed in accordance with a second embodiment of the present invention.
Figure 10:
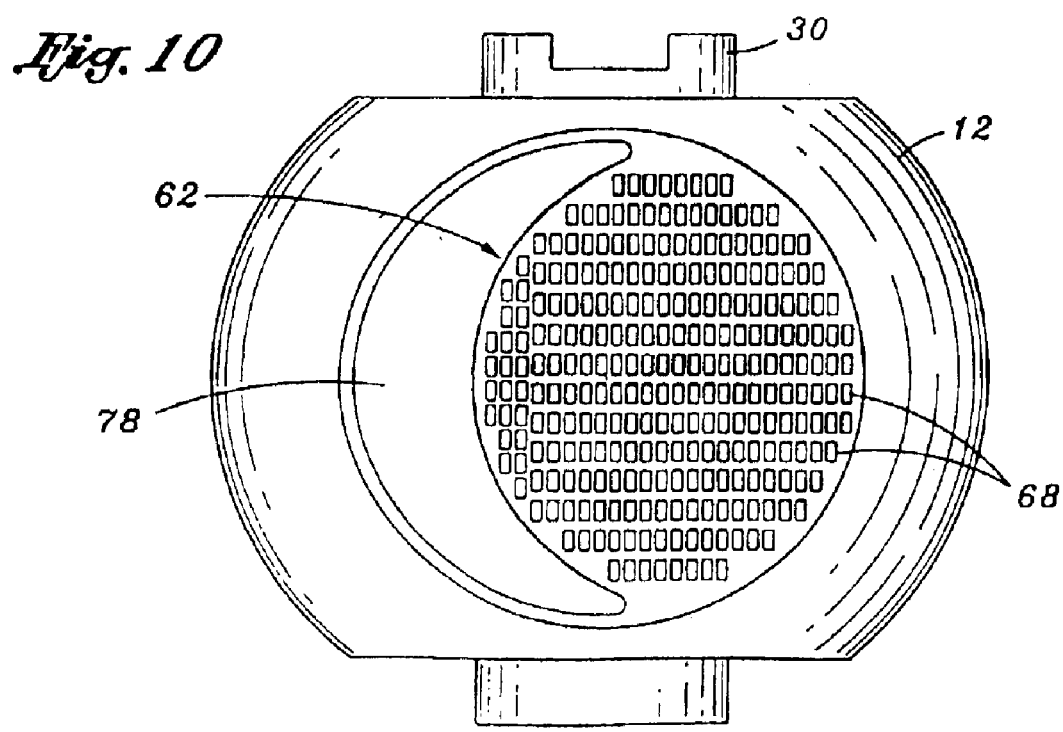
FIG. 10 is a front elevational view of the closure element and impedance assembly shown in FIG. 9.

As best seen in FIGS. 7 and 8, in addition to the main feeder cap 32, the impedance assembly 14 includes a secondary feeder cap 38 which has a circular, plate-like configuration and is abutted against the inner surface of the main feeder cap 32. Disposed within the feeder cap 38 are a plurality of feeder cap passages 40 and an opening 41 which has the same general profile or shape as the opening 37 of the main feeder cap 32. The impedance assembly 14 further comprises a plurality of circularly configured expansion plates 42, each of which includes a plurality of expansion passages 44 formed therein. In addition to the expansion passages 44, each expansion plate 42 includes an opening 45 disposed therein which has the same general shape or profile as the above-described openings 37, 41. Also included in the impedance assembly 14 are a plurality of circularly configured spacer plates 46 which are interleaved between respective pairs of the expansion plates 42 and each include a plurality of spacer passages 48 therein. In addition to the spacer passages 48, each expansion plate 42 includes an opening 49 disposed therein which has the same general shape or profile as the openings 37, 41, 45. Finally, the impedance assembly 14 includes a circularly configured exit plate 50 which itself includes a plurality of exit passages 52 disposed therein. The exit plate 50 also includes an opening 53 disposed therein which has the same general shape or profile as the openings 37, 41, 45, 49.

In the impedance assembly 14, the main feeder cap 32, feeder cap 38, and expansion, spacer and exit plates 42, 46, 50 are assembled in a stacked arrangement, and are preferably of equal outer diameters. As indicated above, the feeder cap 38 is abutted against the inner surface of the main feeder cap 36, with the expansion and spacer plates 42, 46 being stacked in succession upon the feeder cap 38. The uppermost expansion plate 42 is abutted against that surface of the feeder cap 38 opposite that abutted against the inner surface of the main feeder cap 32. The exit plate 50 is abutted against the lowermost expansion plate 42. The main feeder cap 32, feeder cap 38, and expansion, spacer and exit plates 42, 46, 50 are preferably maintained in a stacked arrangement via brazed connections, though other attachment methods may be employed as an alternative.

When the impedance assembly 14 is initially assembled, the main feeder cap 32, feeder cap 38, and expansion, spacer and exit plates 42, 46, 50 are stacked upon each other such that the main feeder passages 36, feeder cap passages 40, expansion passages 44, spacer passages 48, and exit passages 52 are oriented relative to each other in a manner collectively defining a plurality of tortuous passageways 54 and a plurality of generally straight passageways 56 which each extend through the impedance assembly 14. Similar to the main feeder passages 36, the feeder cap passages 40 of the feeder cap 48 include those which have an elongate, slot-like configuration and are arranged in arcuate patterns, and those which have a generally circular configuration. The expansion passages 44 of each of the expansion plates 42, the spacer passages 48 of each of the spacer plates 46, and the exit passages 52 of the exit plate 50 are also provided in both elongate and circular configurations.

In the impedance assembly 14, the main feeder cap 32, feeder cap 38, and expansion, spacer and exit plates 42, 46, 50 are stacked upon each other such that the circularly configured passages thereof are disposed in coaxially aligned sets. Each coaxially aligned set of circularly configured passages collectively define a respective one of the straight passageways 56 of the impedance assembly 14. The elongate passages of the main feeder cap 32, feeder cap 38, and expansion, spacer and exit plates 42, 46, 50 are also arranged in sets wherein the passages of each set are only partially aligned with each other (i.e., only partially overlap) such that each set of the partially aligned elongate passages collectively define a respective one of the tortuous passageways 54.

Figure 6:
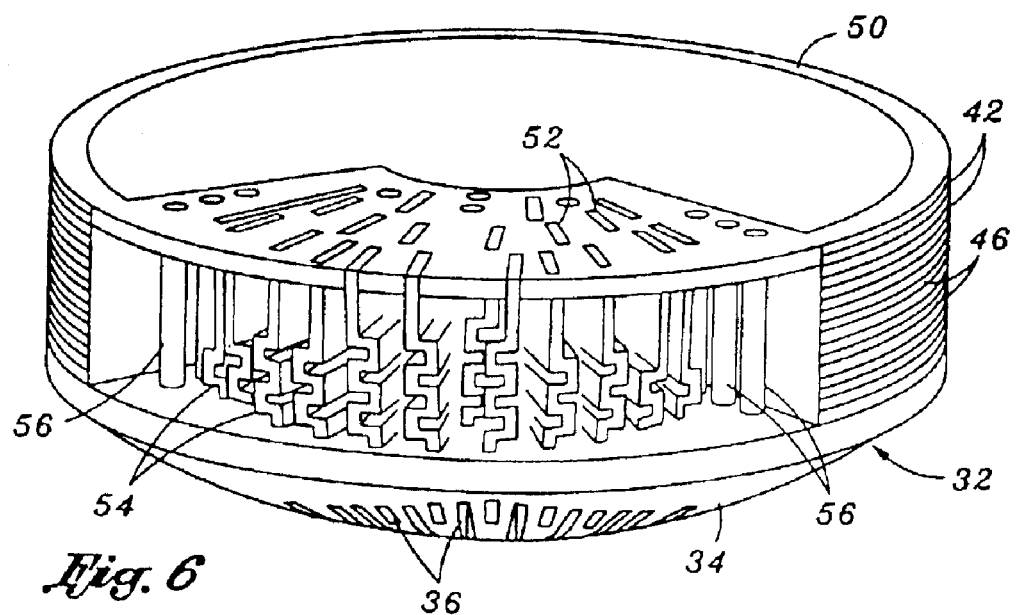
FIG. 6 is a cutaway view of the impedance assembly of the first embodiment illustrating the tortuous flow passageways defined thereby.

As seen in FIG. 6, the tortuous passageways 54 of the impedance assembly 14 are not formed to provide uniform noise or energy attenuation characteristics. In this regard, those tortuous passageways 54 partially defined by the main feeder passages 36 disposed in the approximate center of the arcuate arrangement thereof provide the highest level of energy attenuation capability (i.e., define the greatest number of turns). The noise or energy attenuating capabilities of the remaining tortuous passageways 54 progressively decrease (i.e., the number of turns defined by the passageways 54 is reduced) as they approach respective ones of the opposed ends of the arcuate arrangement of main feeder passages 36. As such, those tortuous passageways 54 disposed closest to each of the sets of circular main feeder passages 36 at the opposed ends of the elongate main feeder passages 36 define the least number of turns, and hence provide a level of energy attenuation exceeding only that of the straight passageways 56.

As is further seen in FIG. 8, when the impedance assembly 14 is initially assembled, the openings 37, 41, 45, 49 and 53 are also aligned with each other and collectively define a flow opening 58 which extends through the impedance assembly 14. The remaining portions of the main feeder cap 32, feeder cap 38, and expansion, spacer and exit plates 42, 46, 50 collectively define an annular outer wall of the impedance assembly 14 and a circumferential section which spans in the range of from about ninety degrees to about one hundred twenty degrees and includes each of the tortuous passageways 54 and straight passageways 56 extending therethrough. As such, the flow opening 58 collectively defined by the openings 37, 41, 45, 49, 53 spans in the range from about 240 degrees to about 270 degrees. Prior to the assembly of the impedance assembly 14, the outer surface 34 of the main feeder cap 32 is machined so as to provide the same with an arcuate, generally convex configuration. The pre-machining thickness of the main feeder cap 32 allows for the completion of this machining operation.

Referring now to FIGS. 2–4, upon the fabrication of the impedance assembly 14, the same is advanced into the bore 24 of the closure assembly 12. It is contemplated that the impedance assembly 14 may be "shrink-fit" into the closure element 12. However, those of ordinary skill in the art will recognize that alternative attachment methods may be employed to facilitate the interface of the impedance assembly 14 to the closure element 12. In any such attachment method, it is preferred that the inner surface of the closure element 12 defining the bore 24 thereof be formed to include an annular shoulder 60 which serves as an abutment or stop surface for the impedance assembly 14. In this regard, the shoulder 60 is oriented such that the abutment of the exit plate 50 thereagainst causes the arcuate outer surface 34 of the main feeder cap 32 to extend in a flush or continuous relationship with the outer surface of the closure element 12 at the inflow end 26 of the bore 24. In this regard, it is contemplated that the outer surface 34 of the main feeder cap 32 will be machined such that the contour is complementary to that of the outer surface of the closure element 12.

Due to the configuration of the impedance assembly 14, the number of tortuous and straight passageways 54, 56 exposed to flow along the axis of the flow path 18 varies as the closure element 12 is rotated from its fully closed position toward its fully open position. In this regard, when the closure element 12 is initially cracked open, fluid will flow only into those tortuous passageways 54 imparting the highest level of energy attenuation, i.e., only those tortuous passageways 54 partially defined by the main feeder passages 36 disposed in the approximate center of the arcuate arrangement thereof are exposed to the fluid flow. As the opening of the closure element 12 progresses, the remaining tortuous passageways 54 of lesser energy attenuating capability are progressively exposed to the fluid flow. Thus, the number of tortuous passageways 54 exposed to fluid flow progressively increases as the closure element 12 is rotated toward its fully open position. Due to their orientations relative to the tortuous passageways 54, the straight passageways 56 are exposed to fluid flow once flow has commenced through virtually all of the tortuous passageways 54. The continued rotation of the closure element 12 toward its fully open position then allows fluid to flow through the flow opening 58 defined by the impedance assembly 14 in an unrestricted manner. When the closure element 12 is ultimately rotated to its fully open position, a portion of the fluid flow continues to flow through the tortuous and straight passageways 54, 56, with the majority of the fluid flow passing through the flow opening 58. Thus, the impedance assembly 14 provides the benefits of those utilized in linear valve arrangements, yet imparts those benefits to the rotary closure element 12 of the valve 10.

Referring now to FIGS. 9–14, there is shown an impedance assembly 62 which is constructed in accordance with a second embodiment of the present invention. Like the impedance assembly 14 of the first embodiment described above, the impedance assembly 62 is carried by the closure element 12, and more particularly is operatively positioned within the bore 24 in a manner which will be described in more detail below. The structural attributes of the impedance assembly 62 also allow the same to be retrofitted to the closure element 12 of an existing valve 10, or provided as an original component thereof.

The impedance assembly 62 comprises a feeder cap 64 which is machined so as to define an arcuate, convex outer surface 66. Disposed within the feeder cap 64 are a plurality of feeder passages 68 which extend therethrough. Each of the feeder passages 68 has a generally rectangular cross-sectional configuration, though those of ordinary skill in the art will recognize that the present invention is not intended to be limited to any particular shape for the feeder passages 68. Also disposed within the feeder cap 64 is a generally crescent-shaped opening 70.

As best seen in FIG. 13, in addition to the feeder cap 64, the impedance assembly 62 includes a plurality of circularly configured impedance plates 72. The impedance plates 72 each include a plurality of impedance passages formed therein. In addition to the impedance passages, each of the impedance plates 72 includes an opening formed therein which has the same general shape or profile of the opening 70 formed within the feeder cap 64. The impedance plates 72 are stacked upon each other, with an upper most one of the impedance plates 72 being abutted against the inner surface of the feeder cap 64. In addition to the feeder cap 64 and impedance plates 72, the impedance assembly 62 includes a plurality of exit passages disposed therein. In addition to the exit passages, the exit plate 74 includes an opening disposed therein which has the same general shape or profile as the opening 70 of the feeder cap 64 and the opening within each of the impedance plates 72.

In the impedance assembly 62, the feeder cap 64, impedance plates 72 and exit plate 74 are assembled in a stacked arrangement, and are preferably of equal outer diameters. As indicated above, the upper most impedance plate 72 within the stack is abutted against the inner surface of the feeder cap 64, with the impedance plates 72 being stacked in succession upon the feeder cap 64. The exit plate 74 is abutted against the lower most impedance plate 72. The feeder cap 64, impedance plates 72 and exit plate 74 are preferably maintained in a stacked arrangement via brazed connections, though other attachment methods may be employed as an alternative.

When the impedance assembly 62 is initially assembled, the feeder cap 64 and impedance and exit plates 72, 74 are stacked upon each other such that the feeder passages 68, impedance passages and exit passages are oriented relative to each other in a manner collectively defining a plurality of tortuous passageways 76 which are best shown in FIG. 14. As is apparent from FIG. 14, some of the tortuous passageways 76 extend longitudinally through the entire length of the impedance assembly 62 (i.e., terminate at the exit plate 74), with some of the tortuous passageways 76 terminating at a side surface collectively defined by the peripheral edges of the impedance plates 72. When the feeder cap 64 and impedance and exit plates 72, 74 are stacked upon each other, the feeder passages 68, impedance passages, and exit passages are arranged in sets wherein certain passages of each set are coaxially aligned with each other in a longitudinal direction, with other passages of the same set being laterally or radially aligned with each other, or only partially aligned in a longitudinal or lateral direction (i.e., only partially overlapping) such that each set of the passages collectively define a respective one of the tortuous passageways 76.

In addition to the feeder passages 68, impedance passages and exit passages being aligned in sets to collectively define the tortuous passageways 76, the opening 70 within the feeder cap 64 and openings within the impedance plates 72 and exit plate 74 are also aligned so as to collectively define a flow opening 78 which extends longitudinally through the impedance assembly 62. As is further seen in FIG. 14, the tortuous passageways 76 of the impedance assembly 62 are not formed to provide uniform noise or energy attenuation characteristics. In this regard, those tortuous passageways 76 disposed furthest from the flow opening 78 are configured to provide the highest level of energy attenuation capability (i.e., define the greatest number of turns). The noise or energy attenuating capabilities of the remaining tortuous passageways 76 progressively decrease (i.e., the number of turns defined by the passageways 76 is reduced) as they approach the flow opening 78. Those tortuous passageways 76 having the highest energy attenuating capabilities (defining the greatest number of turns) each terminate at the exit plate 74. Those tortuous passageways 76 of lesser energy attenuation capability terminate at the side surface collectively define by the impedance plates 72, and hence facilitate outflow directly into the flow opening 78.

Upon the fabrication of the impedance assembly 62, the same is advanced into the bore 24 of the closure element 12. It is contemplated that the impedance assembly 62 may be "shrink-fit" into the closure element 12. However, those of ordinary skill in the art will recognize that alternative attachment methods may be employed to facilitate the interface of the impedance assembly 62 to the closure element 12. When the impedance assembly 62 is properly interfaced to the closure element 12, the arcuate outer surface 66 of the feeder cap 64 will extend in a flush or continuous relationship with the outer surface of the closure element 12 at the inflow end 26 of the bore 24. In this regard, it is contemplated that the outer surface 66 of the feeder cap 64 will be machined such that its contour is complimentary to that of the outer surface of the closure element 12.

Due to the configuration of the impedance assembly 62, the number of tortuous passageways 76 exposed to flow along the axis of the flow path 18 varies as the closure element 12 is rotated from its fully closed position toward its fully open position. In this regard, when the closure element 12 is initially cracked open, fluid will flow only into those tortuous passageways 76 imparting the highest level of energy attenuation. As the opening of the closure element 12 progresses, the remaining tortuous passageways 76 of lesser energy attenuating capability are progressively exposed to the fluid flow. Thus, the number of tortuous passageways 76 exposed to fluid flow progressively increases as the closure element 12 is rotated toward its fully open position. The continued rotation of the closure element 12 toward its fully open position then allows fluid to flow through the flow opening 78 defined by the impedance assembly 62 in an unrestricted manner. When the closure element 12 is ultimately rotated to its fully open position, a portion of the fluid flow continues to flow through the tortuous passageways 76, with fluid flow also passing through the flow opening 78. Thus, like the impedance assembly 14 described above, the impedance assembly 64 of the second embodiment provides the benefits of those utilized in linear valve arrangements, yet imparts those benefits to the rotary closure element 12 of the valve 10.

Referring now to FIGS. 15–23, there is shown an impedance assembly 80 constructed in accordance with a third embodiment of the present invention. Like the impedance assemblies 14, 62 of the first and second embodiments described above, the impedance assembly 80 of the third embodiment is carried by the closure element 12, and more particularly is operatively positioned within the bore 24 in a manner which will be described in more detail below. The structural attributes of the impedance assembly 80 also allow the same to be retrofitted to the closure element 12 of an existing valve 10, or provided as an original component thereof.

Figure 20:
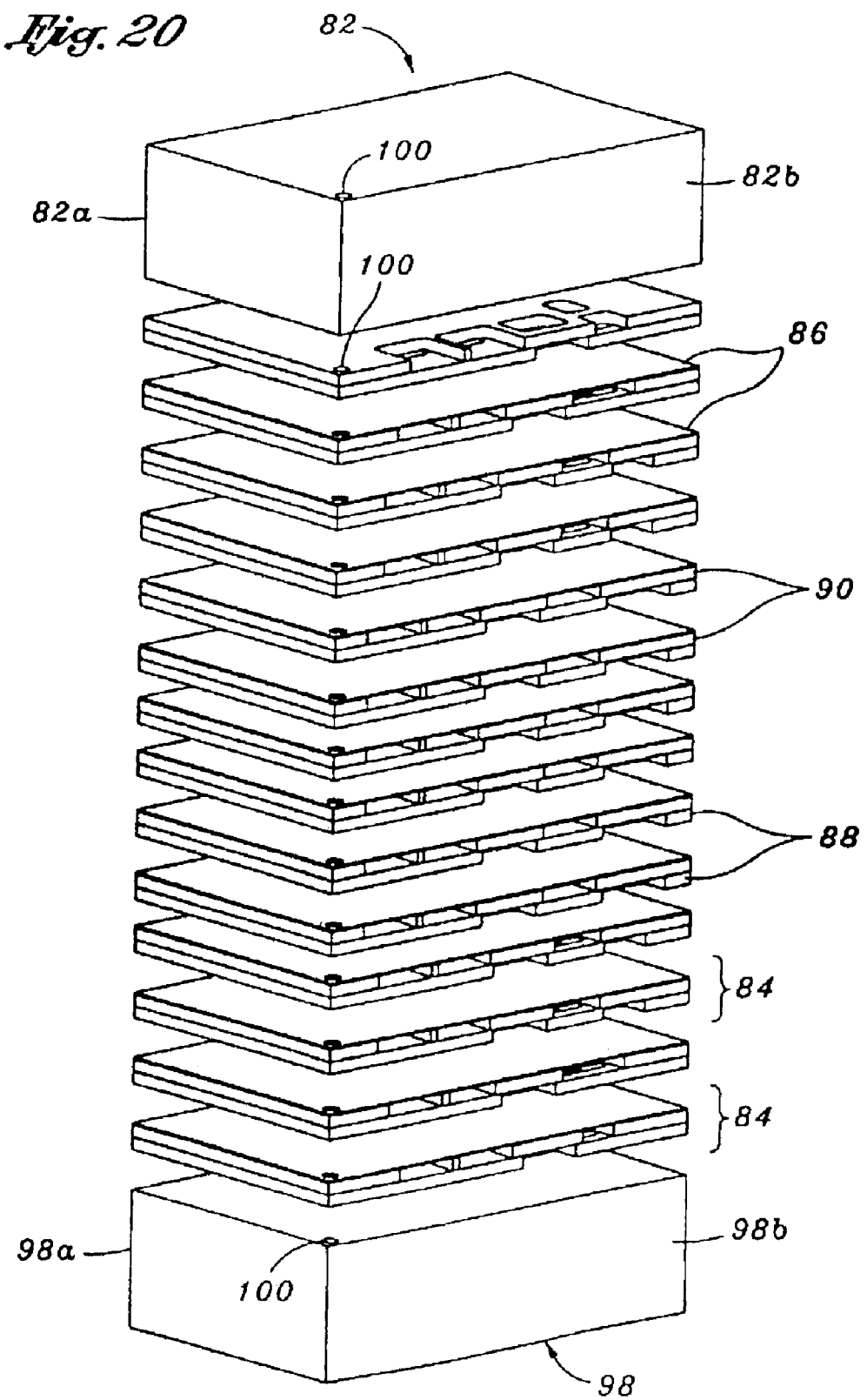
FIG. 20 is an exploded view of the impedance assembly of the third embodiment in a pre-machined configuration.
Figure 21:
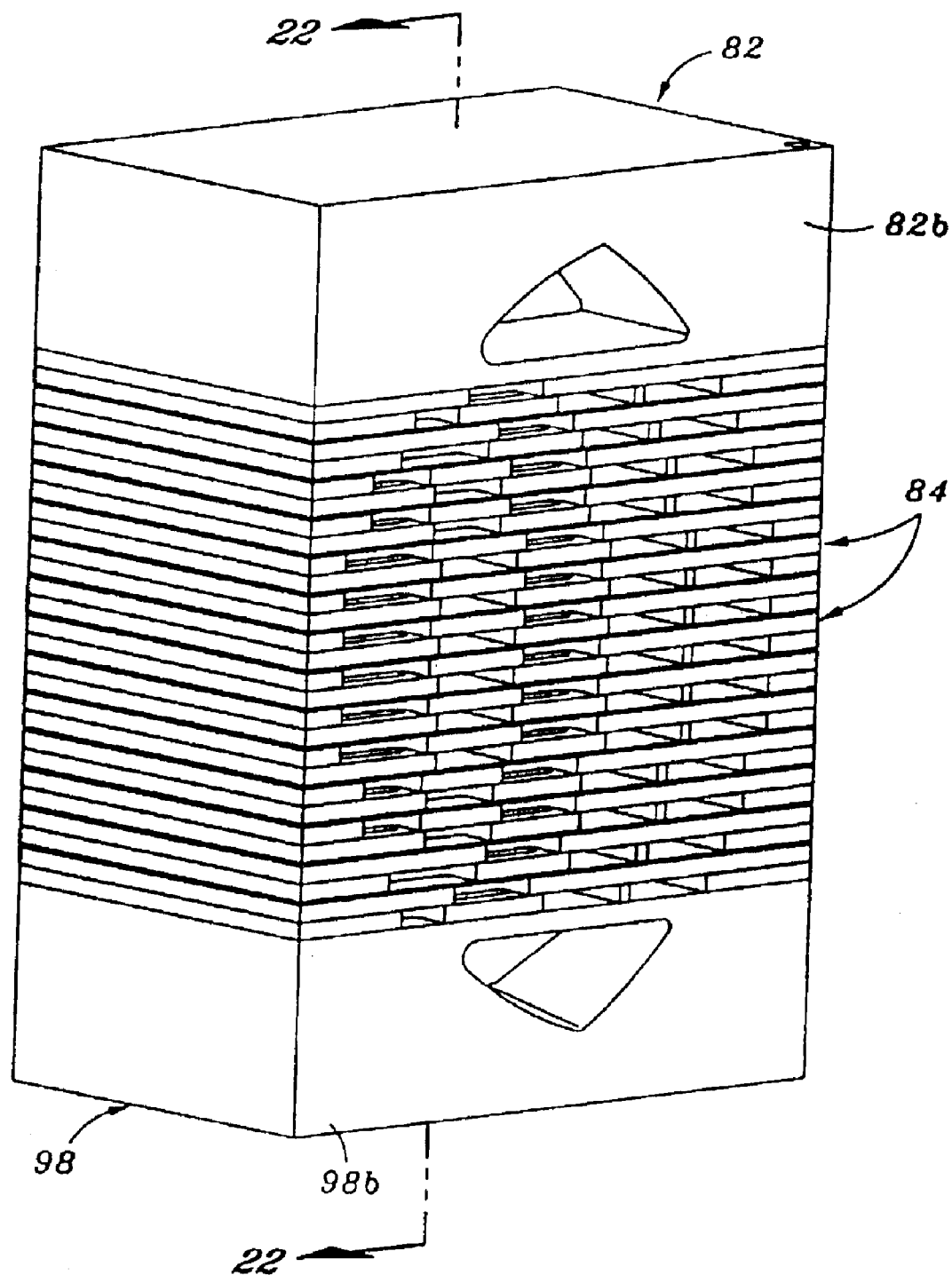
FIG. 21 is a rear perspective view of the impedance assembly of the third embodiment in a partially machined configuration.
Figure 22:
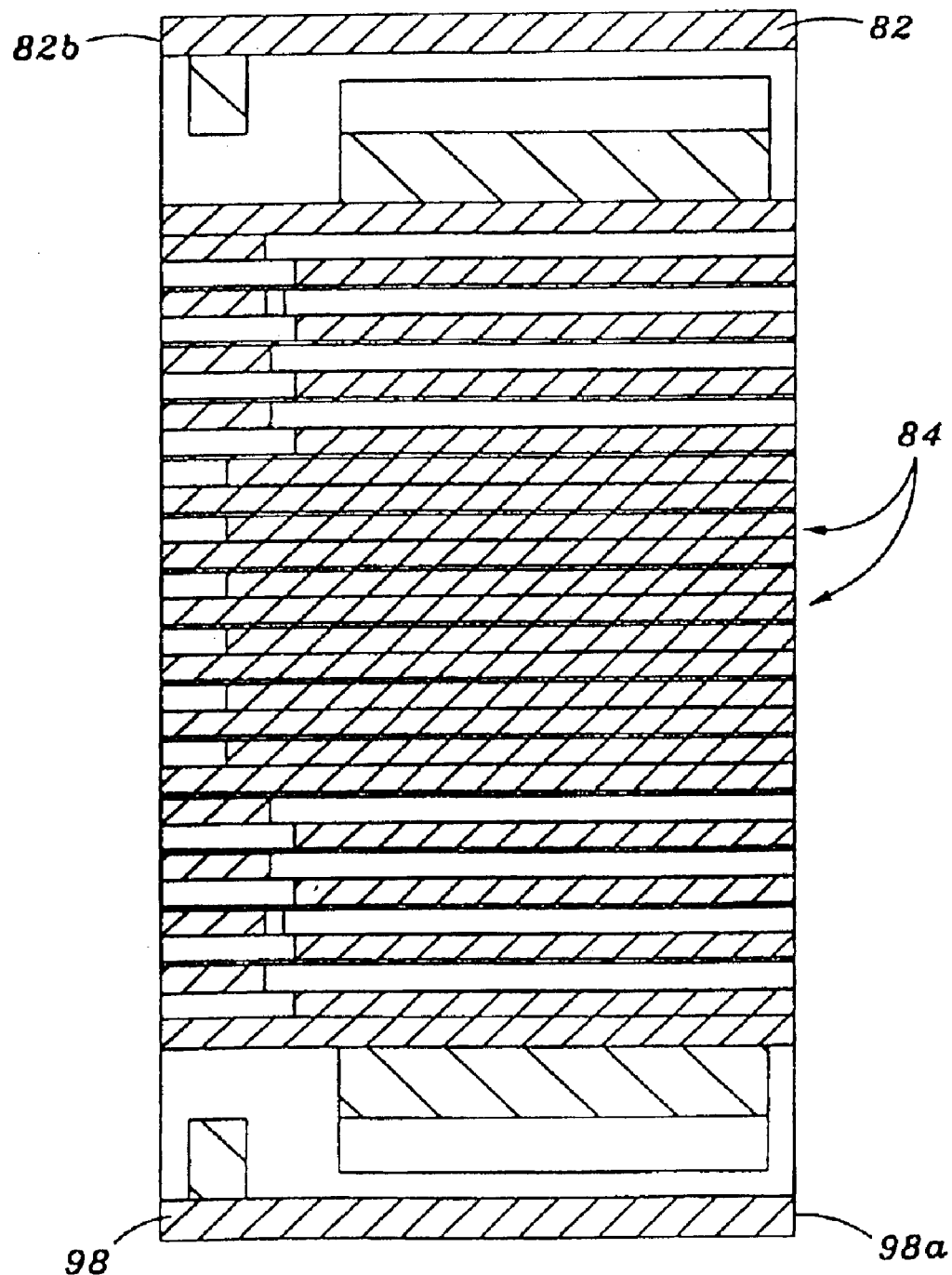
FIG. 22 is a cross-sectional view taken along line 22—22 of FIG. 21.
Figure 23:
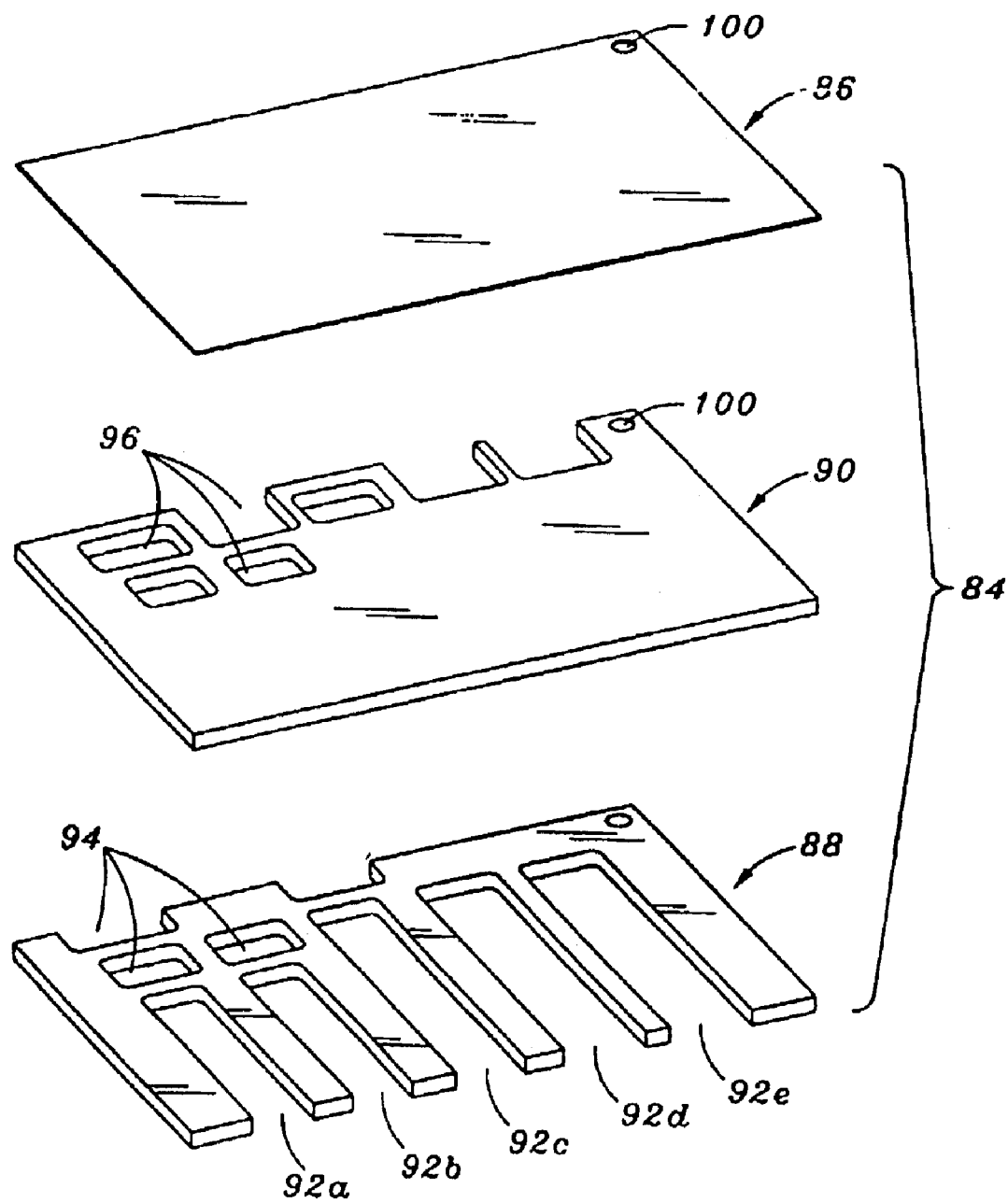
FIG. 23 is an exploded view of one of the disk assemblies of the impedance assembly of the third embodiment in a pre-machined configuration.
Figure 24:
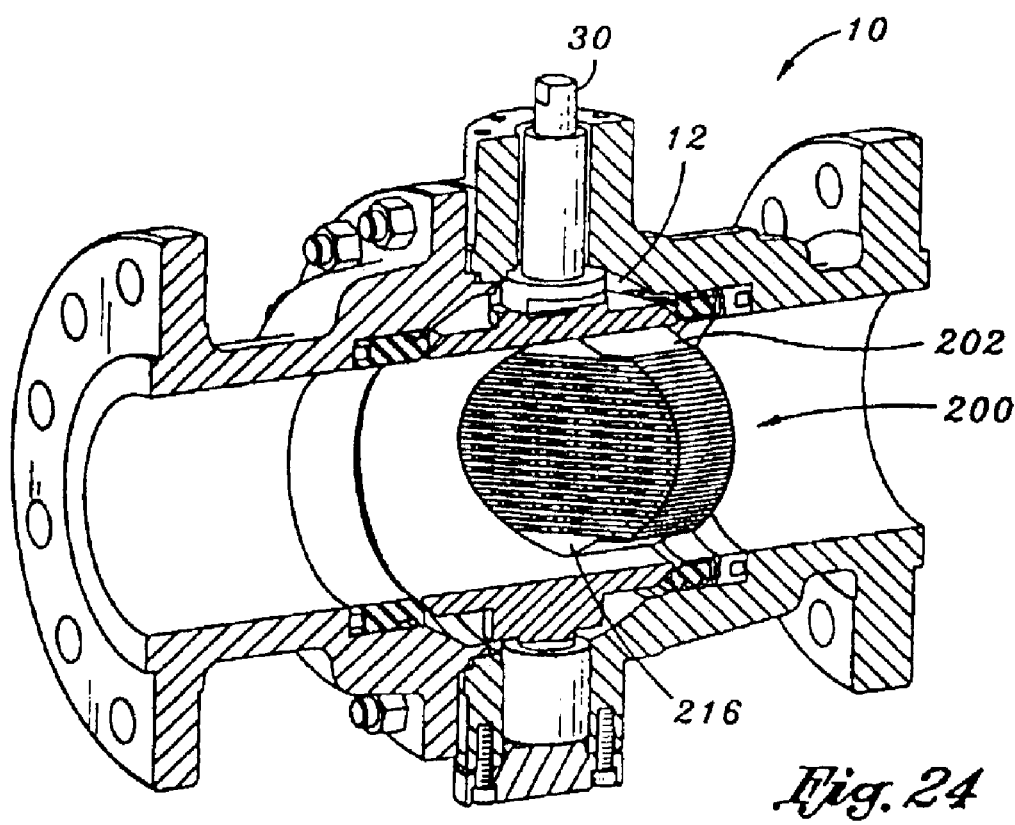
FIG. 24 is a cross-sectional view taken from a front perspective of an exemplary rotary valve having a closure element including an impedance assembly constructed in accordance with a fourth embodiment of the present invention.
Figure 25:
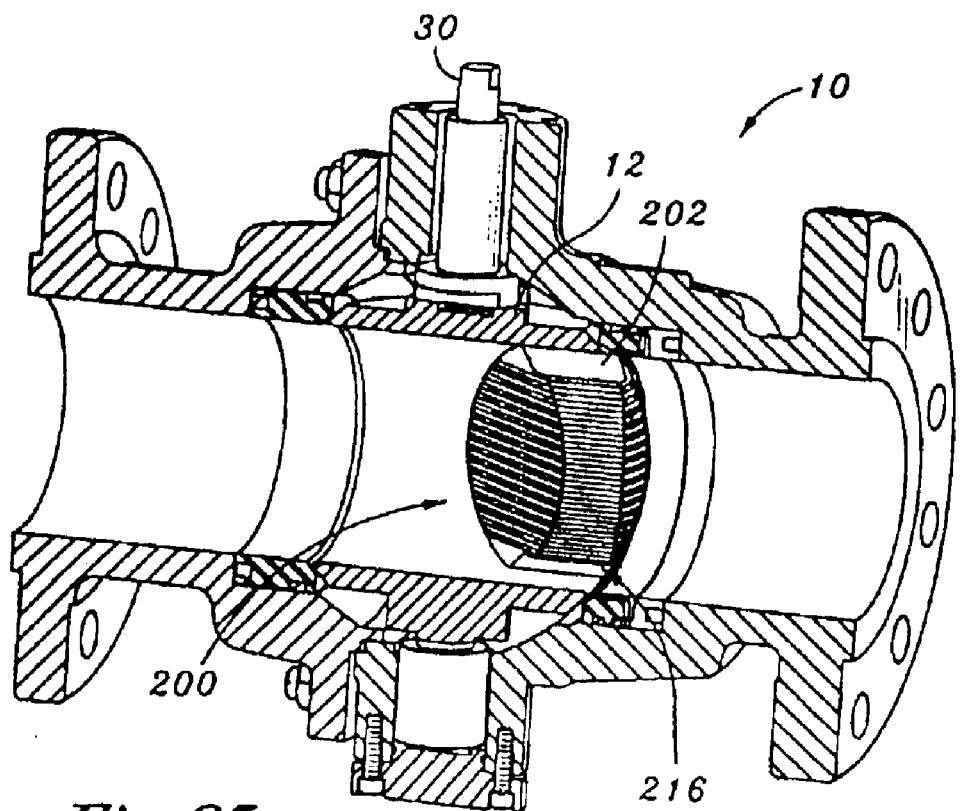
FIG. 25 is a cross-sectional view taken from a rear perspective of the rotary valve shown in FIG. 24 illustrating the impedance assembly of the fourth embodiment.

Referring now to FIGS. 20–22, the impedance assembly 80 comprises an upper cap 82 which, in a preliminary, un-machined state, has a generally rectangular configuration defining an inlet side surface 82a and an outlet side surface 82b. In this regard, the inlet and outlet side surfaces 82a, 82b are defined by respective ones of the longitudinal sides of the rectangularly configured upper cap 82. In addition to the upper cap 82, the impedance assembly 80 includes a plurality of impedance plate assemblies 84 which are maintained in a stacked arrangement, and are best shown in FIGS. 20 and 23. Each impedance plate assembly 84 comprises a rectangularly configured separator plate 86, a rectangularly configured first impedance plate 88, and a rectangularly configured second impedance plate 90. Formed within the first impedance plate 88 are a plurality of elongate slots labeled 92a–92e, respectively. Also formed within the first impedance plate 88 adjacent the inner ends of the slots 92a–92c are various openings 94, some of which are formed within one of the longitudinal peripheral edge segments of the first impedance plate 88. Similarly, formed within the second impedance plate 90 are a plurality of openings 96, some of which also are formed within one of the longitudinal peripheral edge segments of the second impedance plate 90.

Within each impedance plate assembly 84, the separator plate 86, first impedance plate 88, and second impedance plate 90 are maintained in a stacked arrangement. In this regard, the length and width dimensions of the separator plate 86, first impedance plate 88 and second impedance plate 90 are preferably substantially equal, such that the longitudinal and lateral peripheral edge segments thereof are substantially flush when the plates 86, 88, 90 are stacked. The stacking is completed such that the openings 96 of the second impedance plate 90 partially overlap corresponding openings 94 and slots 92a–e of the first impedance plate 88. The separator plate 86 is attached to one side or face of the second impedance plate 90 such that the second impedance plate 90 is disposed or sandwiched between the separator plate 86 and the first impedance plate 88.

As is further seen in FIG. 20, within the impedance assembly 80, the impedance plate assemblies 84 are stacked upon the upper cap 82. The uppermost impedance plate assembly 84 of the impedance assembly 80 does not include the separator plate 86, with the second impedance plate 90 thereof being abutted directly against the bottom surface of the upper cap 82. For each successively stacked impedance plate assembly 84, the separator plate 86 of each such impedance plate assembly 84 is abutted against the first impedance plate 88 of the impedance plate assembly 84 immediately above it.

In addition to the upper cap 82 and impedance plate assemblies 84, the impedance assembly 80 includes a lower cap 90 which, like the upper cap 82, has a generally rectangular configuration in its preliminary, un-machined state, and defines an inlet side surface 98a and an outlet side surface 98b. In the impedance assembly 80, the top surface of the lower cap 98 is abutted against the first impedance plate 88 of the lowermost impedance plate assembly 84. As seen in FIGS. 20–22, the length and width dimensions of the upper and lower caps 82, 98 are also substantially equal to those of the plates 86, 88, 90, with the longitudinal and lateral sides of the upper and lower caps 82, 98 being substantially flush with the longitudinal and lateral peripheral edge segments of the plates 86, 88, 90, i.e., the inlet side surfaces 82a, 98a and outlet side surfaces 82b, 98b are substantially flush or continuous with respective ones of the longitudinal peripheral edge segments of the plates 86, 88, 90.

As is seen in FIGS. 20 and 23, the upper and lower caps 82, 98 and plates 86, 88, 90 each preferably include an alignment or registry aperture 100 disposed within a corner region thereof. The alignment apertures 100 are included in prescribed corner regions of the upper and lower caps 82, 98 and plates 86, 88, 90, and are adapted to facilitate a proper registry between such components in the stacking thereof. In this regard, the apertures 100 are brought into coaxial alignment with each other, and are adapted to receive a retention pin which, when advanced thereinto, assists in maintaining the upper and lower caps 82, 98 and plates 86, 88, 90 in a proper, stacked registry.

In the impedance assembly 80, the stacking of the upper cap 82, impedance plate assemblies 84, and lower cap 98 occurs in a manner wherein the slots 92a–e terminate at the longitudinal peripheral edge segment of the first impedance plate 88 which extends along the inlet side surfaces 82a, 98a of the upper and lower caps 82, 98, and the openings 94, 96 are disposed adjacent to or formed within the longitudinal peripheral edge segments of the first and second impedance plates 88, 90 which extend along the outlet side surfaces 82b, 98b of the upper and lower caps 82, 98. In FIGS. 20 and 21, the impedance plate assemblies 84 are viewed from the rear perspective, and are shown from a front perspective in FIG. 23. The exploded view from the front perspective in FIG. 23 demonstrates that each impedance plate assembly 84 defines a plurality of tortuous passageways which extend between the longitudinal peripheral edge segments of the plates 86, 88, 90 in spaced relation to each other.

Due to the arrangement of the openings 94, 96 within the first and second impedance plates 88, 90, the tortuous passageway partially defined by the slot 92a includes a total of eight turns, with the tortuous passageway partially defined by the slot 92b defining a total of six turns, the tortuous passageway partially defined by the slot 92c defining a total of four turns, and the tortuous passageways partially defined by the slots 92d, 92e each defining a total of two turns. Thus, the number of turns defined by the tortuous passageways decreases as the passageways progress from left to right viewed from the front perspective shown in FIG. 23. Those of ordinary skill in the art will recognize that the number of turns defined by the tortuous passageways as described above is exemplary only, and that slots and openings may be formed in the impedance plates 88, 90 as needed to effectuate the implementation of differing numbers of turns. Moreover, as is seen in FIGS. 20 and 21, the distance separating the slots 92a–e and openings 94, 96 from each other and from the lateral peripheral edge segments of respective ones of the first and second impedance plates 88, 90 is not perfectly uniform within all of the impedance plate assemblies 84. Rather, these separation distances are varied as needed to arrange the tortuous passageways in sets wherein the tortuous passageways of each set define equal numbers of turns but extend in a generally arcuate pattern.

Figure 19:
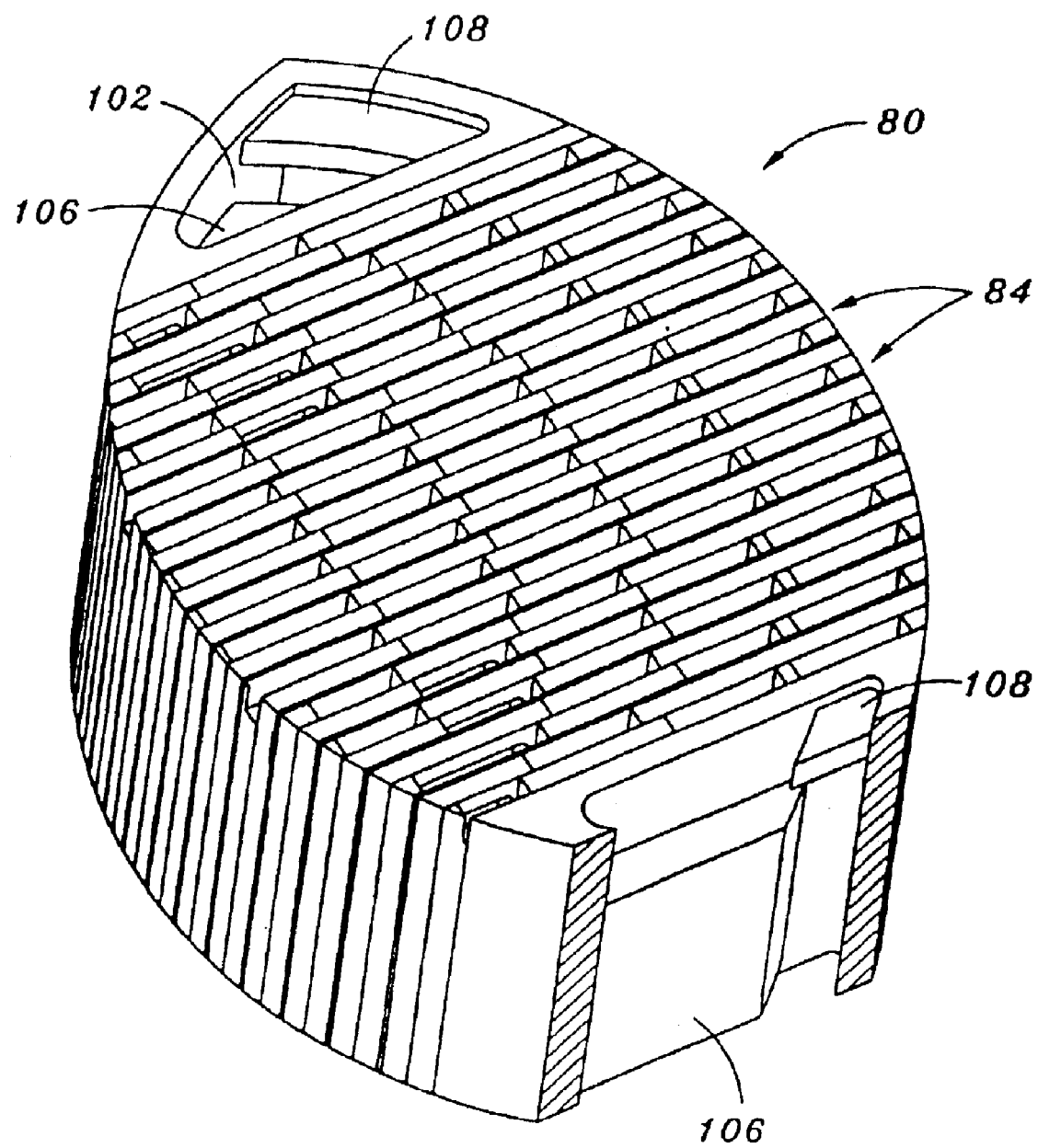
FIG. 19 is a cut-away perspective view of the impedance assembly of the third embodiment illustrating the internal configuration of one of the flow openings thereof.

In the impedance assembly 80 of the third embodiment, the impedance plate assemblies 84 and upper and lower caps 82, 98 are preferably maintained in their stacked arrangement via brazed connections, though other attachment methods may be employed as an alternative. Upon the stacking of the upper and lower caps 82, 98 and impedance plate assemblies 84 in the above-described manner, a top flow opening 102 is formed into the upper cap 82 and extends between the inlet and outlet side surfaces 82a, 82b thereof. Similarly, a bottom flow opening 104 is formed into the lower cap 98 and extends between the inlet and outlet side surfaces 98a, 98b thereof. The top and bottom flow openings 102, 104 may each be formed within respective ones of the upper and lower caps 82, 98 via a wire EDM process. As seen in FIG. 19, preferably disposed within the top flow opening 102 is a first plate 106 and a second plate 108 which are each attached (e.g., welded) to the upper cap 82. The first plate 106 and second plate 108 are arranged within the top flow opening 102 relative to each other such that the top flow opening 102 does not define a straight flow path, but rather defines a tortuous flow path defining two turns. Those of ordinary skill in the art will recognize that differing numbers of plates may be disposed within the top flow opening 102 in differing arrangements as needed to facilitate the creation of differing numbers of turns, or that no plates at all need be included within the top flow opening 102. In the impedance assembly 80, the first and second plates 106, 108 are also disposed within the bottom flow opening 104 in the same arrangement shown in FIG. 19A so as to define a tortuous passageway having two turns therein. It will further be recognized that the top and bottom flow openings 102, 104 may each have a shape differing from that shown in the figures (e.g., tear drop, round, triangular, etc.) to give the trim a specific flow curve characteristic.

Figure 17:
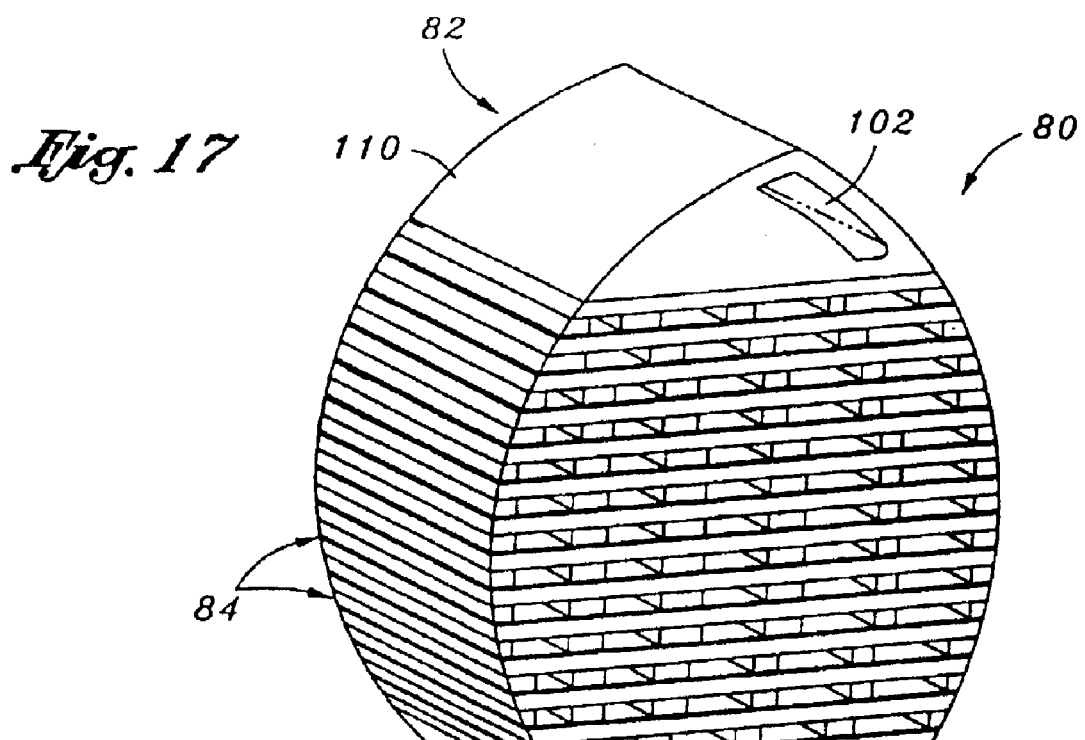
FIG. 17 is a front perspective view of the impedance assembly of the third embodiment.
Figure 18:
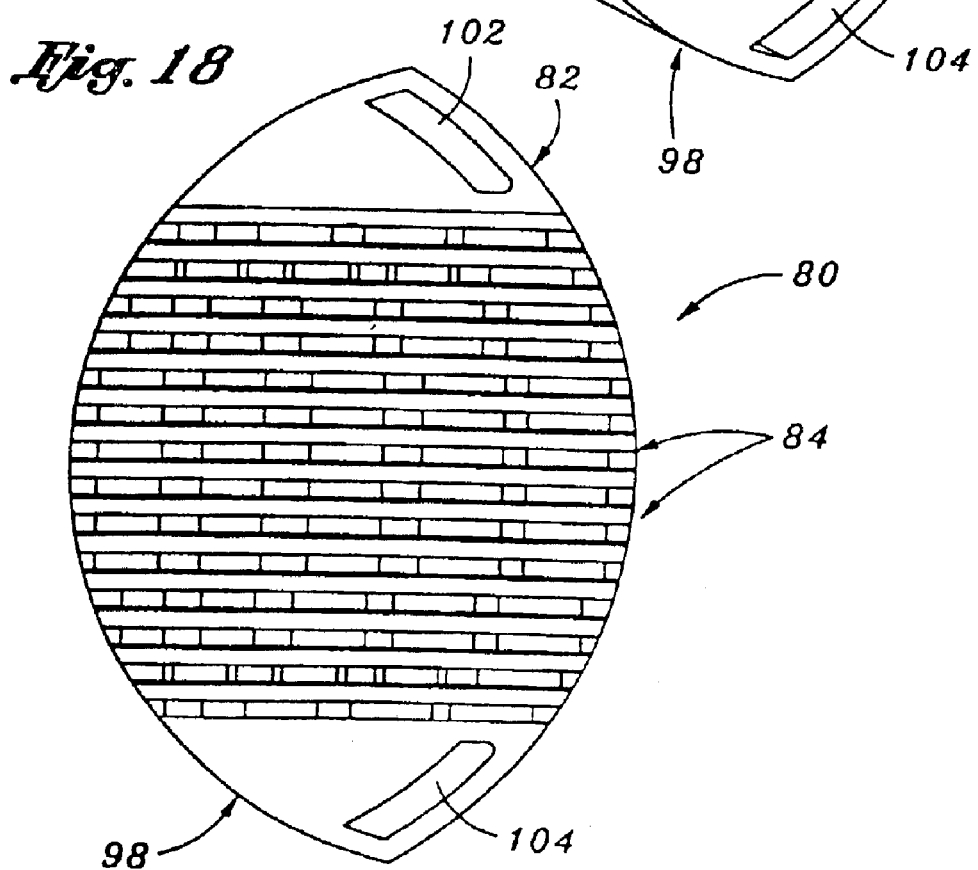
FIG. 18 is a front elevational view of the impedance assembly of the third embodiment.

After the first and second plates 106, 108 have been inserted into each of the top and bottom flow openings 102, 104, the upper and lower caps 82, 98 and impedance plate assemblies 84 of the impedance assembly are machined so as to impart to the stacked arrangement the generally elliptical profile shown in FIGS. 17 and 18. As such, the impedance assembly 80 includes an arcuate outer surface 110 collectively defined by portions of the upper and lower caps 82, 98 and impedance plate assemblies 84, and an arcuate inner surface 112 which is itself collectively defined by portions of the upper and lower caps 82, 98 and impedance plate assemblies 84, and an arcuate inner surface 112 which is itself collectively defined by portions of the upper and lower caps 82, 98 and impedance plate assemblies 84. The outer and inner surfaces 110, 112 meet each other at a top apex 114 defined by the upper cap 82 and disposed adjacent the top flow opening 102, and a bottom apex 116 defined by the lower cap 98 and disposed adjacent the bottom flow opening 104. Within the machined impedance assembly 80, the tortuous passageways of greatest noise or energy attenuating capability (i.e., the tortuous passageways defining the greatest number of turns) are disposed closest to the outer surface 110, with the number of turns (and hence the noise attenuating capability) of the tortuous passageways progressively decreasing as they extend toward the inner surface 112.

Figure 15:
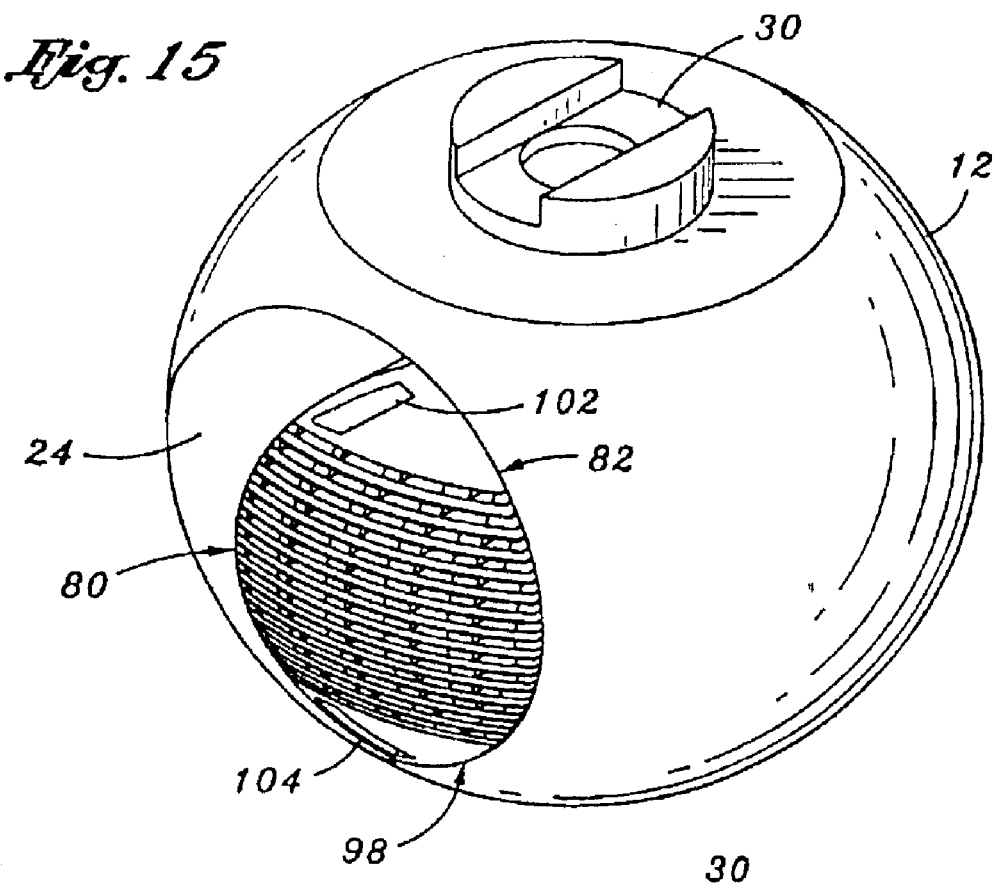
FIG. 15 is a front perspective view of a closure element including an impedance assembly constructed in accordance with a third embodiment of the present invention.
Figure 16:
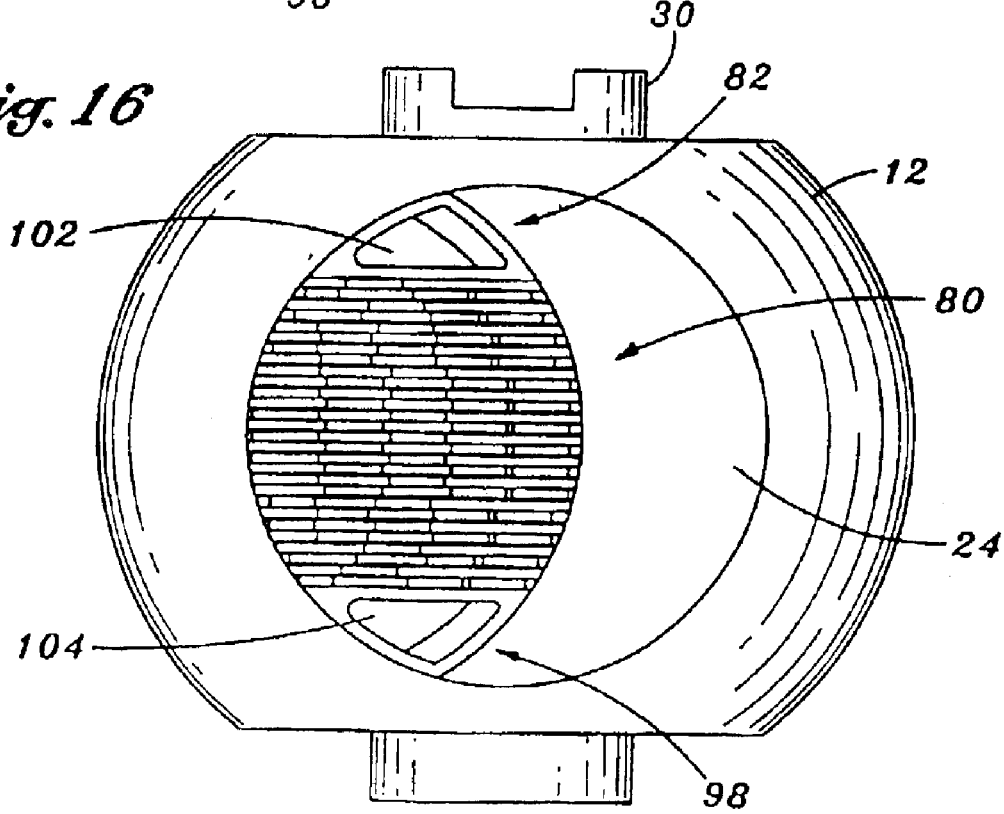
FIG. 16 is a rear elevational view of the closure element and impedance assembly shown in FIG. 15.

Referring now to FIGS. 15 and 16, upon the impedance assembly 80 being machined in the above-described manner, the same is advanced into the bore 24 of the closure element 12. Such advancement is facilitated in a manner wherein the outer surface 110 of the impedance assembly 80 directly engages or abuts a portion of the inner surface of the closure element 12 which defines the bore 24 thereof. In this regard, it is contemplated that the contour of the outer surface 110 will be complementary to that of the inner surface of the closure element 12 defining the bore 24, such that the outer surface 110 may be brought into direct, flush engagement therewith. When properly positioned within the bore 24, a portion of the impedance assembly 80 protrudes from the inflow end 26 of the bore 24. Additionally, the inner surface 112 of the impedance assembly 80 and a portion of the inner surface of the closure element 12 defining the bore 24 thereof collectively define a generally crescent-shaped flow opening 118. The thickness of the impedance assembly 80 is substantially less than the length of the bore 24. Thus, when the impedance assembly 80 is properly positioned within the bore 24, the impedance assembly 80 extends to a depth which is substantially short of the rotational axis of the closure element 12 (i.e., the axis of the stem 30). It is contemplated that the impedance assembly 80 will be welded in place within the bore 24 of the closure element 12, though those of ordinary skill in the art will recognize that alternative attachment methods may also be employed.

Once the impedance assembly 80 has been properly secured within the bore 24 of the closure element 12, that portion of the impedance assembly 80 protruding from the inflow end 26 of the bore 24 is subjected to another machining operation which imparts an arcuate contour or profile thereto as needed to cause the exposed outer inflow end of the impedance assembly 80 to be substantially flush or continuous with the outer surface of the closure element 12 at the inflow end 26 of the bore 24. Stated another way, the impedance assembly 80 is machined such that the contour of the outer inflow end 320 thereof is complementary to that of the outer surface of the closure element 12 as is best seen in FIG. 15.

Due to the configuration of the impedance assembly 80, the number of tortuous passageways exposed to flow along the axis of the flow path 18 varies as the closure element 12 is rotated from its fully closed position toward its fully open position. In this regard, when the closure element 12 is initially cracked open, fluid will flow only into those tortuous passageways of the impedance assembly 80 imparting the highest level of noise or energy attenuation. As the opening of the closure element 12 progresses, the remaining tortuous passageways of the impedance assembly 80 of lesser noise or energy attenuating capability are progressively exposed to the fluid flow. Thus, the number of tortuous passageways exposed to fluid flow progressively increases as the closure element 12 is rotated toward its fully open position.

Due to the configuration of the impedance assembly 80, the number of tortuous passageways exposed to flow along the axis of the flow path 18 varies as the closure element 12 is rotated from its fully closed position toward its fully open position. In this regard, when the closure element 12 is initially cracked open, fluid will flow only into those tortuous passageways of the impedance assembly 80 imparting the highest level of noise or energy attenuation. As the opening of the closure element 12 progresses, the remaining tortuous passageways of the impedance assembly 80 of lesser noise or energy attenuating capability are progressively exposed to the fluid flow. Thus, the number of tortuous passageways exposed to fluid flow progressively increases as the closure element 12 is rotated toward its fully open position.

In addition to flowing through the tortuous passageways, the fluid flows into the top and bottom flow openings 102, 104 of the impedance assembly 80 which, as indicated above, are also tortuous. The continued rotation of the closure element 12 toward its fully open position then allows fluid to flow through the flow opening 118 in an unrestricted manner. When the closure element 12 is ultimately rotated to its fully open position, a portion of the fluid flow continues to flow through the tortuous passageways and top and bottom flow openings 102, 104 of the impedance assembly concurrently with flow through the flow opening 118. Thus, like the impedance assemblies 14, 62 described above, the impedance assembly 80 of the third embodiment provides the benefits of those utilized in linear valve arrangements, yet imparts those benefits to the rotary closure element 12 of the valve 10.

One of the most significant structural distinctions between the impedance assembly 80 of the third embodiment and the impedance assemblies 14 and 62 of the first and second embodiments is that in the impedance assembly 80 of the third embodiment, the impedance plate assemblies 84 are stacked in a direction which is generally perpendicular or normal to the axis defined by the bore 24 of the closure element 12. In contrast, the feeder caps and plates of the impedance assemblies 14, 62 are stacked in a manner where they extend along the axis defined by the bore 24 of the closure element 12.

Referring now to FIGS. 24–33, there is shown an impedance assembly 200 constructed in accordance with a fourth embodiment of the present invention. The impedance assembly 200 of the fourth embodiment is also carried by the closure element 12 and, more particularly, is operatively positioned within the bore 24 in a manner which will be described in more detail below. The structural attributes of the impedance assembly 200 also allow the same to be retrofitted to the closure element 12 of an existing valve 10, or provided as an original component thereof.

The impedance assembly 200 comprises an upper cap 202 which, in a preliminary, un-machined state, has a generally rectangular configuration defining an inlet side surface 202a and an outlet side surface 202b. In addition to the upper cap 202, the impedance assembly 200 includes a plurality of impedance plate assemblies 204 which are maintained in a stacked arrangement, and are best shown in FIGS. 30–33. Each impedance plate assembly 204 comprises a separator plate 206, a first impedance plate 208, and a second impedance plate 210. The plates 206, 208, 210 each preferably have either a rectangular or square configuration. Formed within the first impedance plate 208 are a plurality of openings 212. Similarly, formed within the second impedance plate 210 are a plurality of openings 214. The openings 212, 214 are not each of the same size, or arranged in the same patterns within respective ones of the first and second impedance plates 208, 210. Rather, the size and arrangement of the openings 212, 214 varies within certain ones of the impedance plate assemblies 204 for reasons which will be discussed in more detail below.

Within each impedance plate assembly 204, the separator plate 206, first impedance plate 208, and second impedance plate 210 are maintained in a stacked arrangement. In this regard, the length and width dimensions of the separator plate 206, first impedance plate 208 and second impedance plate 210 are preferably substantially equal, such that corresponding peripheral edge segments thereof are substantially flush when the plates 206, 208, 210 are stacked. The stacking is completed such that the openings 214 of the second impedance plate 210 partially overlap one or more corresponding openings 212 of the first impedance plate 208. The separator plate 206 is attached to one side or face of the first impedance plate 208 such that the first impedance plate 208 is disposed or sandwiched between the separator plate 206 and the second impedance plate 210.

Within the impedance assembly 200, the impedance plate assemblies 204 are stacked upon the upper cap 202. The second impedance plate 210 of the uppermost impedance plate assembly 204 is abutted directly against the bottom surface of the upper cap 202. For each successively stacked impedance plate assembly 204, the second impedance plate 210 of each such impedance plate assembly 204 is abutted against the separator plate 206 of the impedance plate assembly 204 immediately above it. The lowermost impedance plate assembly 204 within the stack does not include the separator plate 206, as will be described in more detail below.

In addition to the upper cap 202 and impedance plate assemblies 204, the impedance assembly 200 of the fourth embodiment includes a lower cap 216 which, like the upper cap 202, has a generally rectangular or square configuration in its preliminary, un-machined state, and defines an inlet side surface 216a and an outlet side surface 216b. In the impedance assembly 200, the top surface of the lower cap 216 is abutted against the first impedance plate 208 of the lowermost impedance plate assembly 204 which, as indicated above, does not include the separator plate 206. The length and width dimensions of the upper and lower caps 202, 216 are substantially equal to those of the plates 206, 208, 210 such that the peripheral sides of the upper and lower caps 202, 216 are substantially flush with corresponding peripheral edge segments of the plates 206, 208, 210.

As is further seen in FIGS. 30–33, the upper and lower caps 202, 216 and plates 206, 208, 210 each preferably include one or more alignment or registry apertures 218 disposed therein. The alignment apertures 218 are adapted to facilitate a proper registry between the upper and lower caps 202, 216 and plates 206, 208, 210 in the stacking thereof. In this regard, the apertures 218 are brought into coaxial alignment with each other in a manner collectively defining two coaxially aligned sets, each of which is adapted to receive a retention pin. The advancement of such retention pins into the coaxially aligned sets of apertures 218 assists in maintaining the upper and lower caps 202, 216 and plates 206, 208, 210 in a proper stacked registry.

The impedance plate assemblies 84 as stacked between the upper cap 202 and the lower cap 216 are shown in FIG. 31. As will be discussed in more detail below, the impedance plate assemblies 204 and the upper and lower caps 202, 216 are preferably maintained in their stacked arrangement via brazed connections, though other attachment methods may be employed as an alternative. Subsequent to the stacking in the above-described manner, the upper and lower caps 202, 216 and intermediate impedance plate assemblies 204 are preferably machined in a manner resulting in the upper and lower caps 202, 216 and the impedance plate assemblies 204 collectively defining an inflow side or end 220 of the impedance assembly 200 which has an angled or beveled configuration, as best shown in FIG. 29. The inflow end 220 of the impedance assembly 200 is preferably formed to extend at an angle of approximately forty-five degrees relative to the axis of the bore 24 of the closure element 12 when the impedance assembly 200 is mounted therein.

In addition to being machined to define the beveled inflow end 220, the upper and lower caps 202, 216 and intervening impedance plate assemblies 204 are further machined to collectively define an arcuately contoured, convex outflow side or end 222. The arcuate contour or profile of the outflow end 222 is adapted to cause the same to be substantially flush or continuous with the outer surface of the closure element 12 at the outflow end 28 of the bore 24 when the impedance assembly 200 is mounted therein. Stated another way, the impedance assembly 200 is machined such that the contour of the outflow end 222 thereof is complementary to that of the outer surface of the closure element 12. The machining operation which imparts the arcuate contour or profile to the outflow end 222 may occur prior or subsequent to the mounting of the impedance assembly 200 into the bore 24 of the closure element 12. However, the machining of the upper and lower caps 202, 216 and impedance plate assemblies 204 as needed to facilitate the formation of the beveled inflow end 220 will necessarily occur prior to the mounting of the impedance assembly 200 within the bore 24.

Figure 33:
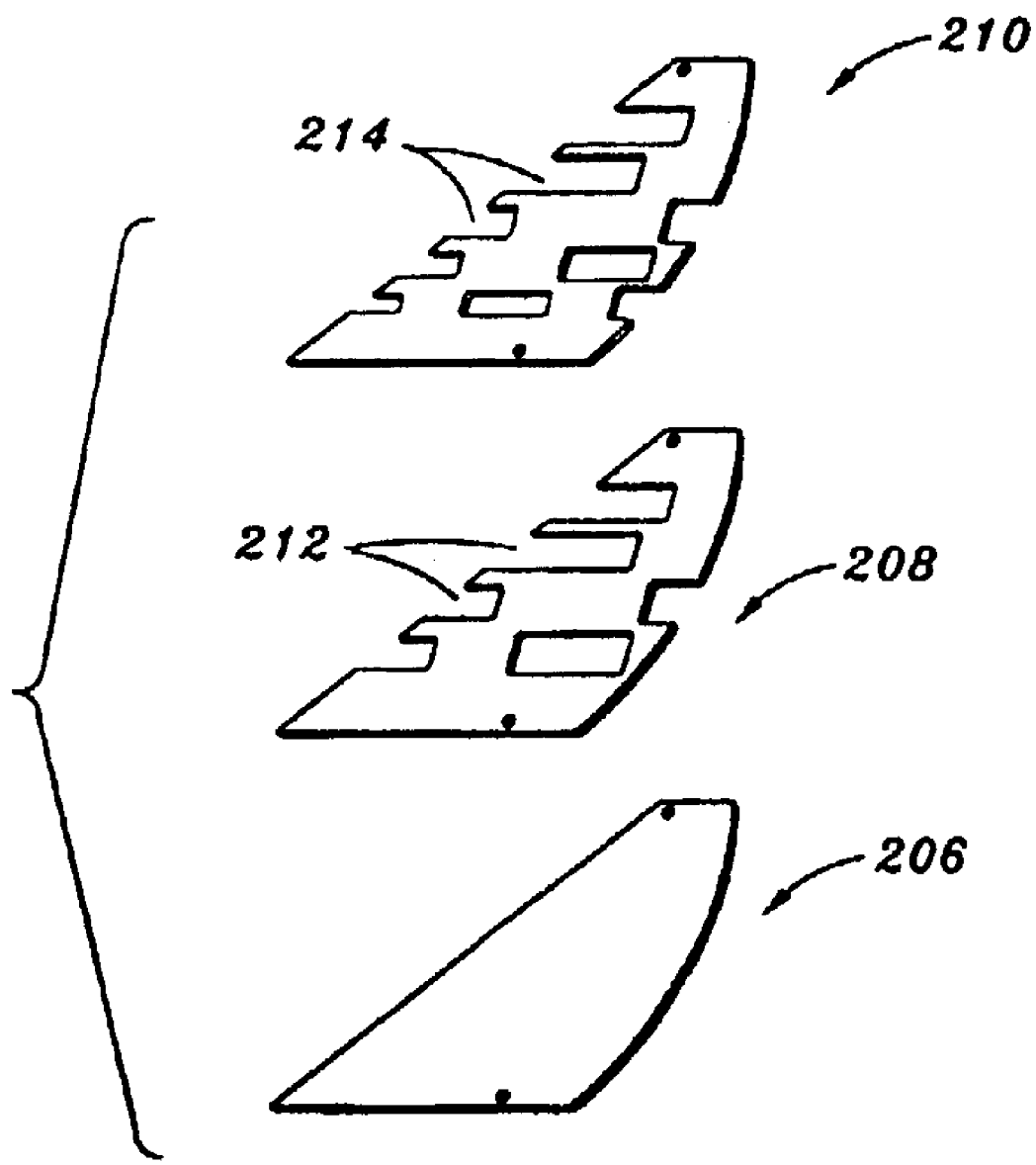
FIG. 33 is an exploded view similar to FIG. 32, illustrating one of the disk assemblies of the impedance assembly of the fourth embodiment in a post-machined configuration.

An exploded view of one of the impedance plate assemblies 204 of the impedance assembly 200, subsequent to the completion of the machining operations used to facilitate the formation of the inflow and outflow ends 220, 222, is shown in FIG. 33. As shown in FIG. 33, the machining of the impedance plate assemblies 204 to form the beveled inflow end 220 results in certain ones of the openings 212, 214 within the first and second impedance plates 208, 210 each communicating with or extending to that edge segment of the corresponding plate 208, 210 which partially defines the inflow end 220. Similarly, the machining of the impedance plate assemblies 204 to form the convex outflow end 222 results in certain ones of the openings 212, 214 extending to that peripheral segment of the corresponding plate 208, 210 which partially defines the outflow end 222. Certain ones of the openings 212, 214 of the first and second impedance plates 208, 210 are unaffected by the machining operations described above.

As is further seen in FIG. 33, as a result of the formation of the inflow and outflow ends 220, 222 in the above-described manner, each of the plates 206, 208, 210 defines an opposed pair of side peripheral edge segments which extend between those peripheral edge segments defining respective ones of the inflow and outflow ends 220, 222. The side peripheral edge segments of each such pair are of differing lengths, with one being substantially shorter than the other. In addition to being machined to form the inflow and outflow ends 220, 222, the upper and lower caps 202, 216 and impedance plate assemblies 204 are further machined so as to impart to the stacked arrangement the generally elliptical profile best shown in FIGS. 27–29. As such, the impedance assembly 200 includes an arcuate outer surface 224 collectively defined by the side peripheral edge segments of the plates 206, 208, 210 of shorter length and portions of the upper and lower caps 202, 216. In addition to the outer surface 224, the impedance assembly 200 defines an arcuate inner surface 226 which is collectively defined by the side peripheral edge segments of the plates 206, 208, 210 of greater length and portions of the upper and lower caps 202, 216. These outer and inner surfaces 224, 226 meet each other at a top apex 228 defined by the upper cap 202, and a bottom apex 230 defined by the lower cap 216.

Due to the arrangement of the openings 212, 214 within the first and second impedance plates 208, 210 of each impedance plate assembly 204, each of the impedance plate assemblies 204 defines a plurality of fluid passageways which are tortuous and extend between those peripheral edge segments partially defining respective ones of the inflow and outflow ends 220, 222. These tortuous fluid passageways are disposed in spaced relation to each other and define differing numbers of right-angle turns. More particularly, the number of turns defined by the tortuous fluid passageways decreases as the passages progress from the outer surface 224 to the inner surface 226 as viewed from the front perspective shown in FIG. 27. Thus, those passageways defining the greatest number of turns are disposed closest to the side peripheral edge segments of the plates 208, 210 of greatest length, with those passageways defining the least number of turns being disposed closest to the side peripheral edge segments of the plates 208, 210 of shorter length. As is further seen in FIG. 33, the arrangement of the openings 212, 214 within the plates 208, 210 maximizes the surface area on each of the plates 208, 210 which is available for use as a brazing area. Such increased brazing area enhances the integrity of the attachment between the plates 206, 208, 210 within the impedance assembly 200.

As will be recognized, those tortuous passageways providing the greatest noise or energy attenuating capability are those defining the greatest number of turns which, as indicated above, are disposed closest to the outer surface 224. The number of turns (and hence the noise attenuating capability) of the tortuous passageways progressively decreases as they extend toward the inner surface 226, as also indicated above.

Upon the impedance assembly 200 being machined in the above-described manner, the same is advanced into the bore 24 of the closure element 12. Such advancement is facilitated in a manner wherein the outer surface 224 of the impedance assembly 200 directly engages or abuts a portion of the inner surface of the closure element 12 which defines the bore 24 thereof. In this regard, it is contemplated that the contour of the outer surface 224 will be complementary to that of the inner surface of the closure element 12 defining the bore 24, such that the outer surface 224 may be brought into direct, flush engagement therewith. When properly positioned within the bore 24, the outflow end 222 of the impedance assembly 200 will extend to the outflow end 28 of the bore 24 in flush relation to the outer surface of the closure element 12. However, if the outflow end 222 has not yet been machined into the impedance assembly 200, the same will be positioned within the bore 24 such that a portion thereof protrudes from the outflow end 28 of the bore 24, with the impedance assembly 200 thereafter being machined so as to facilitate the formation of the outflow end 222 which extends in continuous, flush relation to the outer surface of the closure element 12.

Figure 26:
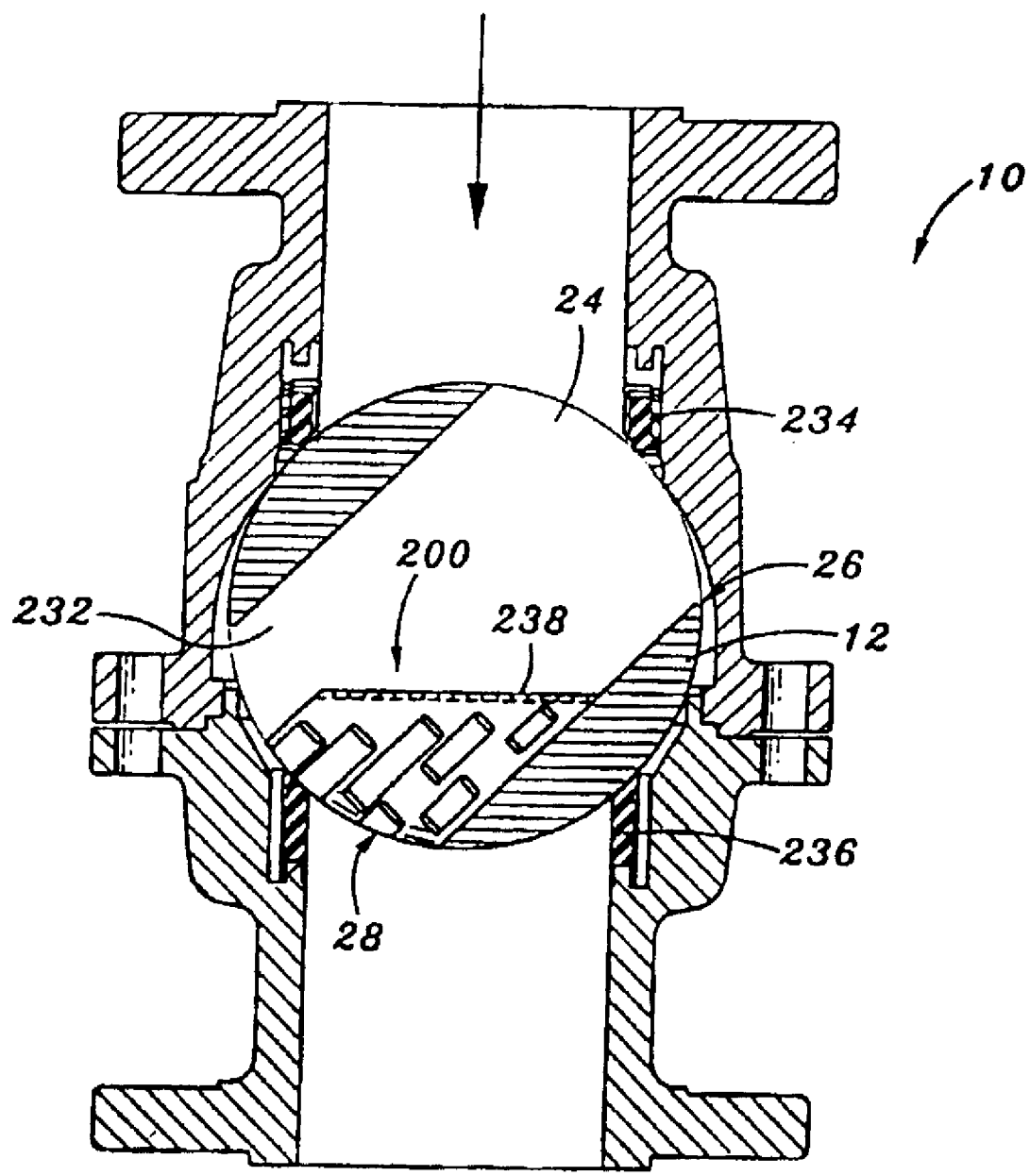
FIG. 26 is a cross-sectional view taken from a top perspective of an exemplary rotary valve including the impedance assembly of the fourth embodiment, illustrating the closure element of the rotary valve in a partially open state.
Figure 30:
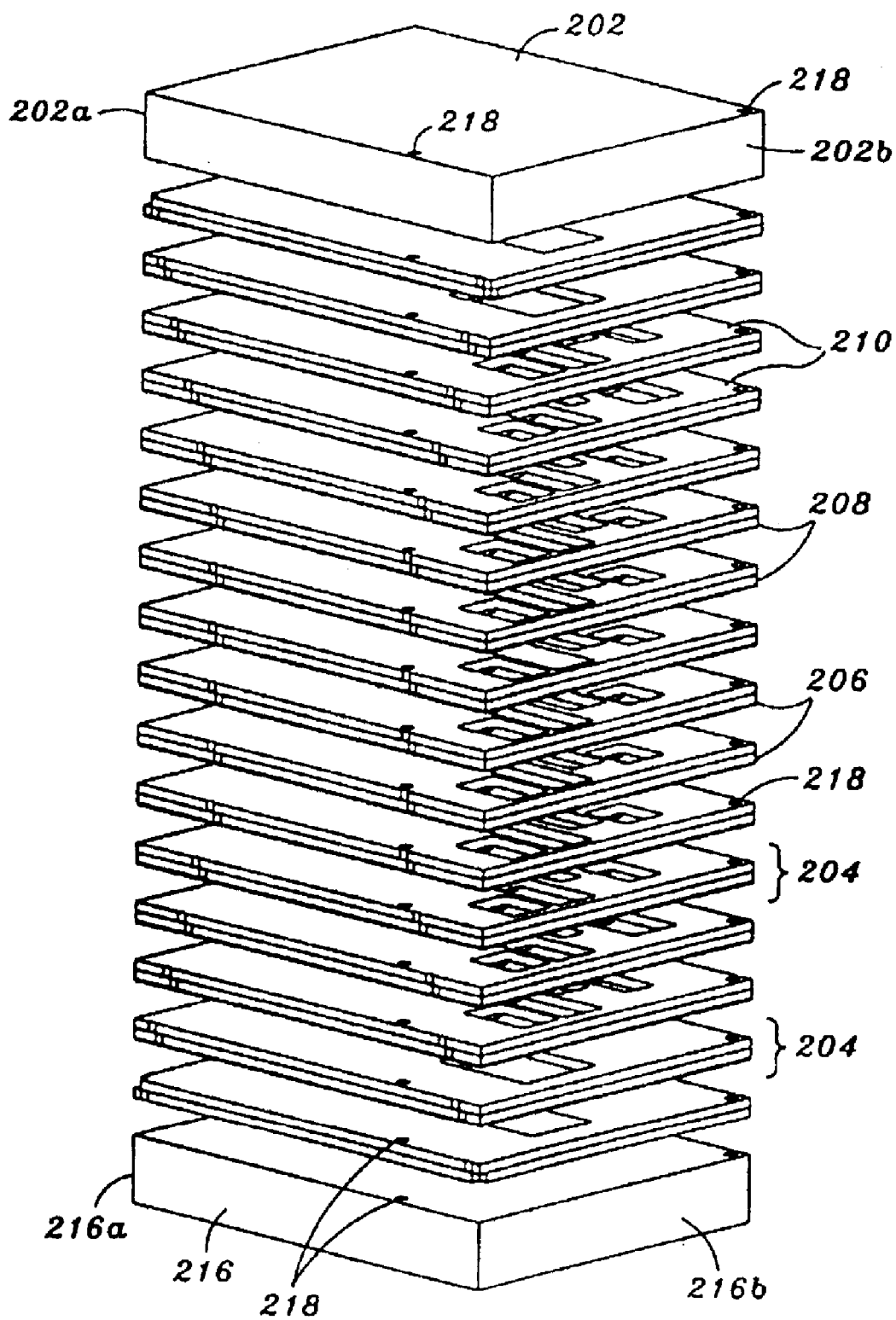
FIG. 30 is an exploded view of the impedance assembly of the fourth embodiment in a pre-machined configuration.

The mounting of the impedance assembly 200 into the bore 24 of the closure element 12 is preferably accomplished through the use of welds. Upon such mounting, the inner surface 226 of the impedance assembly 200 and a portion of the inner surface of the closure element 12 defining the bore 24 thereof collectively define a generally crescent-shaped flow opening 232. The thickness of the impedance assembly 200, even at its thickest point, is substantially less than the length of the bore 24. Thus, when the impedance assembly 200 is properly positioned within the bore 24, the majority of the impedance assembly 200 (and hence the majority of the tortuous fluid passageways defined thereby) extends between the rotational axis of the closure element 12 (i.e., the axis of the stem 30) and the outflow end 28 of the bore 24. However, as seen in FIG. 26, portions or segments of those fluid passageways defining the greatest number of turns (i.e., those passageways disposed closest to the outer surface 224) extend upstream of the rotational axis of the closure element 12 (i.e., between the axis of the stem 30 and the inflow end 26 of the bore 24). However, those of ordinary skill in the art will recognize that the impedance assembly 200 may be sized such that the entirety thereof is disposed downstream of the rotational axis of the closure element 12.

Due to the configuration of the impedance assembly 200, the number of tortuous passageways directly impinged by flow along the axis of the flow path 18 varies as the closure element 12 is rotated from its fully closed position toward its fully open position. In this regard, as seen in FIG. 26, when the closure element 12 is initially cracked open, the fluid flow into the bore 24 directly impinges only those tortuous passageways of the impedance assembly 200 imparting the highest level of noise or energy attenuation. As the opening of the closure element 12 progresses, the remaining tortuous passageways of the impedance assembly 200 of lesser noise or energy attenuating capability are progressively directly impinged by the flow of fluid into the bore 24 of the closure element 12. Thus, the number of tortuous passageways directly impinged by fluid flow into the bore 24 progressively increases as the closure element 12 is rotated toward its fully open position. The continued rotation of the closure element 12 toward its fully open position then allows fluid to flow through the flow opening 232 in an unrestricted manner. When the closure element 12 is ultimately rotated to its fully open position, a portion of the fluid flow continues to flow through the tortuous passageways concurrently with flow through the flow opening 232.

In the impedance assembly 200 of the fourth embodiment, the impedance plate assemblies 204 are stacked in a direction which is generally perpendicular or normal to the axis defined by the bore 24 of the closure element 12. Advantageously, by orienting the inflow end 220 of the impedance assembly 200 downstream of the inflow end 26 of the bore 24, any solid "trash" particles which become trapped in the inflow end 220 of the impedance assembly 200 are downstream of the soft front seat 234 of the valve 10. As a result, the susceptibility of the front seat 234 to being cut or torn by such trash particles during rotation of the closure element 12 between its fully open and fully closed positions is eliminated. As will be recognized, in typical valve construction, it is preferred that the front seat 234 be fabricated from a soft material as is adapted to facilitate the creation of a bubble-tight seal (e.g., a Class 6 shut-off). As indicated above, the location of the impedance assembly 200 at the back of the closure element 12 eliminates the susceptibility to the tearing of the soft front seat 234 due to the solid trash particles being collected inside the bore 24 of the closure element 12, far away from the front seat 234. Thus, the soft upstream front seat 234 need not be used for throttling, and may be used only as a primary shut-off seal which is its main function in a regular trunnion ball valve. As a result, the downstream back seat 236 may be converted to a metal seal used strictly for throttling purposes.

In addition to the aforementioned advantages attributable to the placement of the impedance assembly 200 to the back of the bore 24 within the closure element 12, the formation of the angled inflow end 220 of the impedance assembly 200 (which is located within the bore 24) provides an optimal angle for trash deflection. In this regard, solid particles will tend to be deflected toward the flow opening 232, which provides a "self-flushing" feature. It is contemplated that the impedance assembly 200 may be provided with a layer 238 of wire mesh material which is attached to and completely covers the inflow end 220 (i.e., the deflection face). The wire mesh layer 238 covering the inflow end 220 further protects against any clogging of the tortuous fluid passageways, while further enhancing the noise attenuation capabilities of the impedance assembly 200. It is contemplated that several layers 238 of wire mesh material (as opposed to a single layer 238) may be stacked upon the inflow end 220. In this regard, the wire mesh layer(s) 238, in addition to keeping trash out of the tortuous fluid passageways, can be used as a noise attenuation barrier, with differing levels of noise reduction being achievable based on the number of layers 238 of wire mesh material stacked upon the inflow end 220. The increased brazing area on the plates 206, 208, 210, as described above, provides an increase in brazing quality and a reduced potential for any of the plates 206, 208, 210 from breaking off of the stack. Additionally, the overall configuration of the impedance assembly 200 provides for the use of additional stringer welds to facilitate the attachment thereof to the closure element 12.

Figure 34:
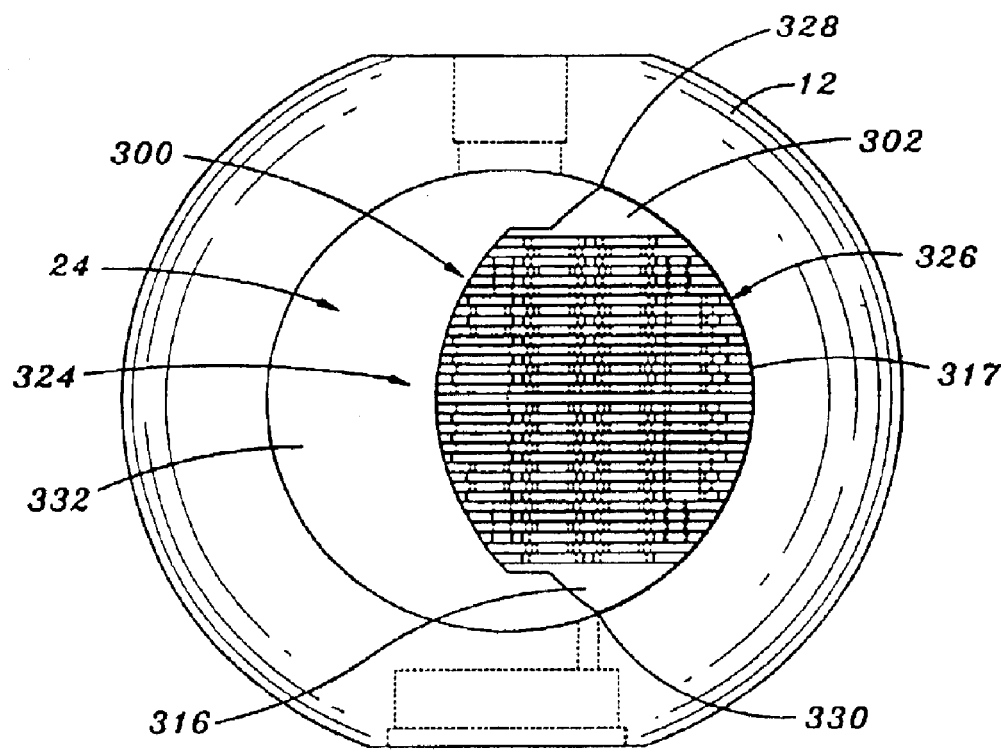
FIG. 34 is a rear elevational view of the closure element outfitted with an impedance assembly constructed in accordance with a fifth embodiment of the present invention.
Figure 35:
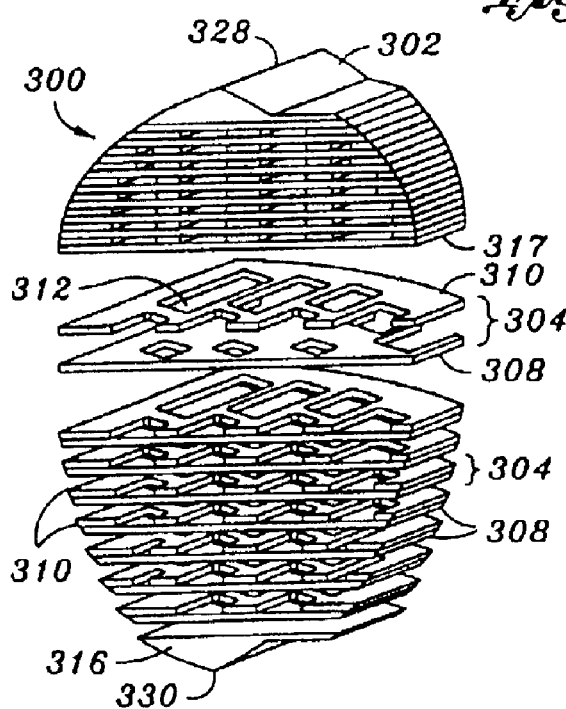
FIG. 35 is an exploded view of the impedance assembly of the fifth embodiment shown in FIG. 34.
Figure 36:
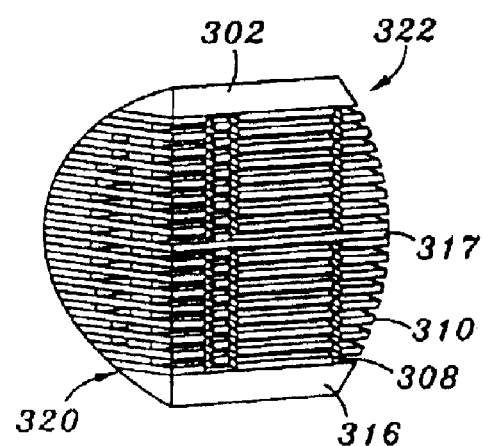
FIG. 36 is a partial cross-sectional view of the impedance assembly of the fifth embodiment, illustrating the flow pattern of fluid therethrough.

Referring now to FIGS. 34–36, there is shown an impedance assembly 300 constructed in accordance with a fifth embodiment of the present invention. The impedance assembly 300 of the fifth embodiment is also carried by the closure element 12 and, more particularly, is operatively positioned within the bore 24 in a manner which will be described in more detail below. The structural attributes of the impedance assembly 300 allow the same to be retrofitted to the closure element 12 of an existing valve 10, or provided as an original component thereof.

The impedance assembly 300 of the fifth embodiment bears substantial structural similarity to the impedance assembly 200 of the fourth embodiment as described above. The impedance assembly 300 comprises an upper cap 302 which defines an inlet side surface and an opposed outlet side surface. In addition to the upper cap 302, the impedance assembly 300 includes a plurality of impedance plate assemblies 304 which are maintained in a stacked arrangement and are best shown in FIGS. 35 and 36. Each impedance plate assembly 304 comprises a first impedance plate 308 and a second impedance plate 310. In a preliminary, unmachined state, the plates 308, 310 each preferably have either a rectangular or square configuration. Formed within the first impedance plate 308 is a plurality of openings 312. Similarly, formed within the second impedance plate 310 are a plurality of openings 314. The openings 312, 314 are not each of the same size, or arranged in the same patterns within respective ones of the first and second impedance plates 308, 310. Rather, the size and arrangement of the openings 312, 314 vary within certain ones of the impedance plate assemblies 304 for reasons which will be discussed in more detail below.

Within each impedance plate assembly 304, the first impedance plate 308 and second impedance plate 310 are maintained in a stacked arrangement. In this regard, when the first and second impedance plates 308, 310 are in the preliminary, unmachined state, the length and width dimensions thereof are preferably substantially equal, such that corresponding peripheral edge segments thereof are substantially flush when the plates 308, 310 are stacked. The stacking is completed such that the openings 314 of the second impedance plate 310 partially overlap one or more corresponding openings 312 of the first impedance plate 308.

Within the impedance assembly 300, the impedance plate assemblies 304 are stacked upon the upper cap 302. The second impedance plate 310 of the uppermost impedance plate assembly 304 is abutted directly against the bottom surface of the upper cap 302. For each successively stacked impedance plate assembly 304, the second impedance plate 310 of each such impedance plate assembly 304 is abutted against the first impedance plate 308 of the impedance plate assembly 304 immediately above it.

In addition to the upper cap 302 and impedance plate assemblies 304, the impedance assembly 300 of the fifth embodiment includes a lower cap 316 which also defines an inlet side surface and an opposed outlet side surface. In the impedance assembly 300, the top surface of the lower cap 316 is abutted against the first impedance plate 308 of the lowermost impedance plate assembly 304. In their preliminary, unmachined states, the upper and lower caps 302, 316 each have a generally rectangular or square configuration. In this regard, the length and width dimensions of such unmachined upper and lower caps 302, 316 are substantially equal to those of the unmachined plates 308, 310 such that the peripheral sides of the upper and lower caps 302, 316 are substantially flush with corresponding peripheral edge segments of the plates 308, 310.

One of the primary structural distinctions between the impedance plate assemblies 304 of the impedance assembly 300 and the above-described impedance plate assemblies 204 of the impedance assembly 200 is that a separator plate (like the separator plate 206 of each impedance plate assembly 204) is not included in each impedance plate assembly 304. However, as seen in FIGS. 34–36, it is contemplated that a single separator plate 317 may be included in the approximate center of the stack of impedance plate assemblies 304. In this regard, equal numbers of impedance plate assemblies 304 are stacked between the separator plate 317 and upper cap 302, and between the separator plate 317 and lower cap 316. Thus, the first impedance plate 308 of the lowermost impedance plate assembly 304 in the upper set is abutted against and attached to the separator plate 317. Similarly, the second impedance plate 310 of the uppermost impedance plate assembly 304 in the lower set is abutted against and attached to the separator plate 317. In its preliminary, unmachined state, the separator plate 317 also has a generally rectangular or square configuration, the length and width dimensions of which are substantially equal to those of the plates 308, 310 in their preliminary, unmachined state. The separator plate 317 and plates 308, 310 are also preferably of substantially equal thickness. The inclusion of the separator plate 317 provides various economies in relation to the manufacture of the impedance assembly 300. In this regard, it is contemplated that the flow pattern provided by the impedance plate assemblies 304 of the lower set will be a mirror image of the flow pattern provided by the impedance plate assemblies 304 of the upper set.

In the impedance assembly 300, the impedance plate assemblies 304, separator plate 317, and upper and lower caps 302, 316 are preferably maintained in their stacked arrangement via brazed connections, though other attachment methods may be employed as an alternative. Subsequent to being stacked in the above-described manner, the upper and lower caps 302, 316 and intermediate impedance plate assemblies 304 and separator plate 317 are preferably machined in a manner resulting in the upper and lower caps 302, 316, the impedance plate assemblies 304, and the separator plate 317 collectively defining an inflow side or end 320 of the impedance assembly 300 which has an angled or beveled configuration, as best shown in FIG. 35. The inflow end 320 of the impedance assembly 300 is preferably formed to extend at an angle of approximately forty-five degrees relative to the axis of the bore 24 of the closure element 12 when the impedance assembly 300 is mounted therein.

In addition to being machined to define the beveled inflow end 320, the upper and lower caps 302, 316 and intervening impedance plate assemblies 304 and separator plate 317 are further machined to collectively define an arcuately contoured, convex outflow side or end 322. The arcuate contour or profile of the outflow end 322 is adapted to cause the same to be substantially flush or continuous with the outer surface of the closure element 12 at the outflow end 28 of the bore 24 when the impedance assembly 300 is mounted therein. Stated another way, the impedance assembly 300 is machined such that the contour of the outflow end 322 thereof is complementary to that of the outer surface of the closure element 12. The machining operation which imparts the arcuate contour or profile to the outflow end 322 may occur prior or subsequent to the mounting of the impedance assembly 300 into the bore 24 of the closure element 12. However, the machining of the upper and lower caps 302, 316, impedance plate assemblies 304, and separator plate 317 as needed to facilitate the formation of the beveled inflow end 320 will necessarily occur prior to the mounting of the impedance assembly 300 within the bore 24. As best seen in FIG. 35, the machining of the impedance plate assemblies 304 to form the beveled inflow end 320 results in certain ones of the openings 314 within the second impedance plates 310 each communicating with or extending to that edge segment of the corresponding plate 310 which partially defines the inflow end 320. Similarly, the machining of the impedance plate assemblies 304 to form the convex outflow end 322 results in certain ones of the openings 312 extending to that peripheral edge segment of the corresponding first impedance plate 308 which partially defines the outflow end 322. Certain ones of the openings 312, 314 of the first and second impedance plates 308, 310 are unaffected by the machining operations described above.

As further seen in FIG. 35, as a result of the formation of the inflow and outflow ends 320, 322 in the above-described manner, each of the plates 308, 310, 317 defines an opposed pair of side peripheral edge segments which extend between those peripheral edge segments defining respective ones of the inflow and outflow ends 320, 322. The side peripheral edge segments of each such pair are of differing lengths, with one being substantially shorter than the other. In addition to being machined to form the inflow and outflow ends 320, 322, the upper and lower caps 302, 316, impedance plate assemblies 304, and separator plate 317 are further machined so as to impart to the stacked arrangement the generally elliptical profile best shown in FIGS. 34 and 35. As such, the impedance assembly 300 includes an arcuate outer surface 324 collectively defined by the side peripheral edge segments of the plates 308, 310, 317 of shorter length and portions of the upper and lower caps 302, 316. In addition to the outer surface 324, the impedance assembly 300 defines an arcuate inner surface 326 which is collectively defined by the side peripheral edge segments of the plates 308, 310, 317 of greater length and portions of the upper and lower caps 302, 316. These outer and inner surfaces 324, 326 meet each other at a top apex 328 defined by the upper cap 302, and a bottom apex 330 defined by the lower cap 316.

As best seen in FIG. 36, due to the arrangement of the openings 312, 314 within the first and second impedance plates 308, 310 of each impedance plate assembly 304, each of the impedance plate assemblies 304 defines a plurality of fluid passageways which are tortuous and extend between those peripheral edge segments partially defining respective ones of the inflow and outflow ends 320, 322. These tortuous fluid passageways are disposed in spaced relation to each other and define differing numbers of right-angle turns. More particularly, the number of turns defined by the tortuous fluid passageways decreases as the passages progress from the outer surface 324 to the inner surface 326 as viewed from the front perspective shown in FIG. 34. Thus, those passageways defining the greatest number of turns are disposed closest to the side peripheral edge segments of the plates 308, 310, 317 of greatest length, with those passageways defining the least number of turns being disposed closest to the side peripheral edge segments of the plates 308, 310, 317 of shorter length. The arrangement of the openings 312, 314 within the plates 308, 310 maximizes the surface area on each of the plates 308, 310 which is available for use as a brazing area. Such increased brazing area enhances the integrity of the attachment between the plates 308, 310, 317 within the impedance assembly 300. Also increasing the integrity of the brazed connections is the absence of any separator plate within each impedance plate assembly 304. The elimination of the separator plates within the impedance plate assemblies 304 further reduces material, cutting and brazing costs, in addition to eliminating weaker brazing links within the impedance assembly 300.

In the impedance assembly 300, those tortuous passageways providing the greatest noise or energy attenuating capability are those defining the greatest number of turns which, as indicated above, are disposed closest to the outer surface 324. The number of turns (and hence the noise attenuating capability) of the tortuous passageways progressively decreases as they extend toward the inner surface 326, as also indicated above. Those of ordinary skill in the art will recognize that the tortuous passageways may optionally be formed to define equal numbers of turns, despite the lengths of such tortuous passageways differing attributable to the overall configuration of the impedance assembly 300.

Upon the impedance assembly 300 being machined in the above-described manner, the same is advanced into the bore 24 of the closure element 12. Such advancement is facilitated in a manner wherein the outer surface 324 of the impedance assembly 300 directly engages or abuts a portion of the inner surface of the closure element 12 which defines the bore 24 thereof. In this regard, it is contemplated that the contour of the outer surface 324 will be complementary to that of the inner surface of the closure element 12 defining the bore 24, such that the outer surface 324 may be brought into direct, flush engagement therewith. When properly positioned within the bore 24, the outflow end 322 of the impedance assembly 300 will extend to the outflow end 28 of the bore 24 in flush relation to the outer surface of the closure element 12. However, if the outflow end 322 has not yet been machined into the impedance assembly 300, the same will be positioned within the bore 24 such that a portion thereof protrudes from the outflow end 28 of the bore 24, with the impedance assembly 300 thereafter being machined so as to facilitate the formation of the outflow end 322 which extends in continuous, flush relation to the outer surface of the closure element 12.

The mounting of the impedance assembly 300 into the bore 24 of the closure element 12 is preferably accomplished through the use of welds. Upon such mounting, the inner surface 326 of the impedance assembly 300 and a portion of the inner surface of the closure element 12 defining the bore 24 thereof collectively define a generally crescent-shaped flow opening 332. The thickness of the impedance assembly 300, even at its thickest point, is substantially less than the length of the bore 24. Thus, when the impedance assembly 300 is properly positioned within the bore 24, the majority of the impedance assembly 300 (and hence the majority of the tortuous fluid passageways defined thereby) extends between the rotational axis of the closure element 12 and the outflow end 28 of the bore 24. Portions or segments of those fluid passageways defining the greatest number of turns (i.e., those passageways disposed closest to the outer surface 324) extend upstream of the rotational axis of the closure element 12. However, those of ordinary skill in the art will recognize that the impedance assembly 300 may be sized such that the entirety thereof is disposed downstream of the rotational axis of the closure element 12.

Due to the configuration of the impedance assembly 300 the number of tortuous passageways directly impinged by flow along the axis of the flow path 18 varies as the closure element 12 is rotated from its fully closed position toward its fully open position. In this regard, when the closure element 12 is initially cracked open, the fluid flow into the bore 24 directly impinges only those tortuous passageways of the impedance assembly 300 imparting the highest level of noise or energy attenuation. As the opening of the closure element 12 progresses, the remaining tortuous passageways of the impedance assembly 300 of lesser noise or energy attenuating capability are progressively directly impinged by the flow of fluid into the bore 24 of the closure element 12. Thus, the number of tortuous passageways directly impinged by fluid flow into the bore 24 progressively increases as the closure element 12 is rotated toward its fully open position. The continued rotation of the closure element 12 toward its fully open position then allows fluid to flow through the flow opening 332 in an unrestricted manner. When the closure element 12 is ultimately rotated to its fully open position, a portion of the fluid flow continues to flow through the tortuous passageways concurrently with flow through the flow opening 332.

In the impedance assembly 80 of the third embodiment shown in FIGS. 15 and 16 and the impedance assembly 200 of the fourth embodiment shown in FIGS. 27 and 28, the tortuous passageways are arranged in a series of vertical columns which are not straight, but rather have arcuate profiles. Similarly, the main feeder passages 36 in the impedance assembly 14 of the first embodiment as shown in FIG. 3 are arranged in an arcuate pattern. In contrast, as is best seen in FIG. 34, in the impedance assembly 300 of the fifth embodiment, the tortuous fluid passageways are arranged in a series of vertical columns which are generally straight rather than arcuate. The arrangement of the tortuous passageways in generally straight columns does not compromise the noise or energy attenuating capabilities of the impedance assembly 300, yet provides manufacturing economies in relation thereto. Additionally, the openings 312, 314 in the plates 308, 310 are sized and configured in a manner preventing any direct, angular flow of fluid through the impedance assembly 300. As indicated above, the openings 312, 314 are further preferably sized and configured such that the tortuous passageways defined by the upper and lower sets of impedance plate assemblies 304 of the impedance assembly 300 are arranged as mirror images to each other.

In the impedance assembly 300 of the fifth embodiment, the impedance plate assemblies 304 (and separator plate 317) are stacked in a direction which is generally perpendicular or normal to the axis defined by the bore 24 of the closure element 12. Advantageously, by orienting the inflow end 320 of the impedance assembly 300 downstream of the inflow end 26 of the bore 24, any solid "trash" particles which become trapped in the inflow end 320 are downstream of the soft front seat 234 of the valve 10. As a result, the susceptibility of the front seat 234 to being cut or torn by such trash particles during rotation of the closure element 12 between its fully open and fully closed positions is eliminated. The formation of the angled inflow end 320 of the impedance assembly 300 also provides an optimum angle for trash deflection. In this regard, solid particles will tend to be deflected toward the flow opening 332, which provides a "self-flushing" feature. It is contemplated that the impedance assembly 300 may be provided with a wire mesh material layer similar to the above-described layer 238 which would be attached to and completely cover the inflow end 320 (i.e., the deflection face). In the impedance assembly 300 of the fifth embodiment, the elimination of separator plates within the individual impedance plate assemblies 304 improves the pressure distribution across the individual plates 308, 310, thus minimizing any susceptibility of the plates 308, 310 of each impedance plate assembly 304 from separating from each other or breaking off of the stack. In this regard, as seen in FIG. 36, fluid is able to migrate freely between the various tortuous passageways of the impedance plate assemblies 304 of the upper set and the impedance plate assemblies 304 of the lower set. The migration of fluid between the impedance plate assemblies 304 of the upper and lower sets is effectively blocked by the intervening separator plate 317.

Advantageously, a valve 10 outfitted to include the impedance assembly 300 may be used bidirectionally, i.e., fluid initially enters the outflow end 28 of the bore 24 and hence the outflow end 322 of the impedance assembly 300, and exits the inflow end 320 of the impedance assembly 300. Due to its structural and functional attributes, the impedance assembly 300 maintains good control over such reversed flow. The flow of fluid into the bore 24 in normal, non-reversed flow assists in maintaining the structural integrity of the impedance assembly 300. In this regard, when the closure element 12 is cracked open, the entirety of the bore 24 and hence the inflow end 320 of the impedance assembly 300 are exposed to the inlet pressure which exceeds the pressure level applied to the outflow end 322 of the impedance assembly 300, only a portion of which is exposed to downstream pressure. This pressure differential wherein the pressure at the inflow end 320 exceeds the pressure at the outflow end 322 assists in maintaining the plates 308, 310, 317 within the impedance assembly 300 in the stacked configuration, i.e., assists in preventing the detachment or separation of any plate 308, 310 from the stack.

Figure 37:
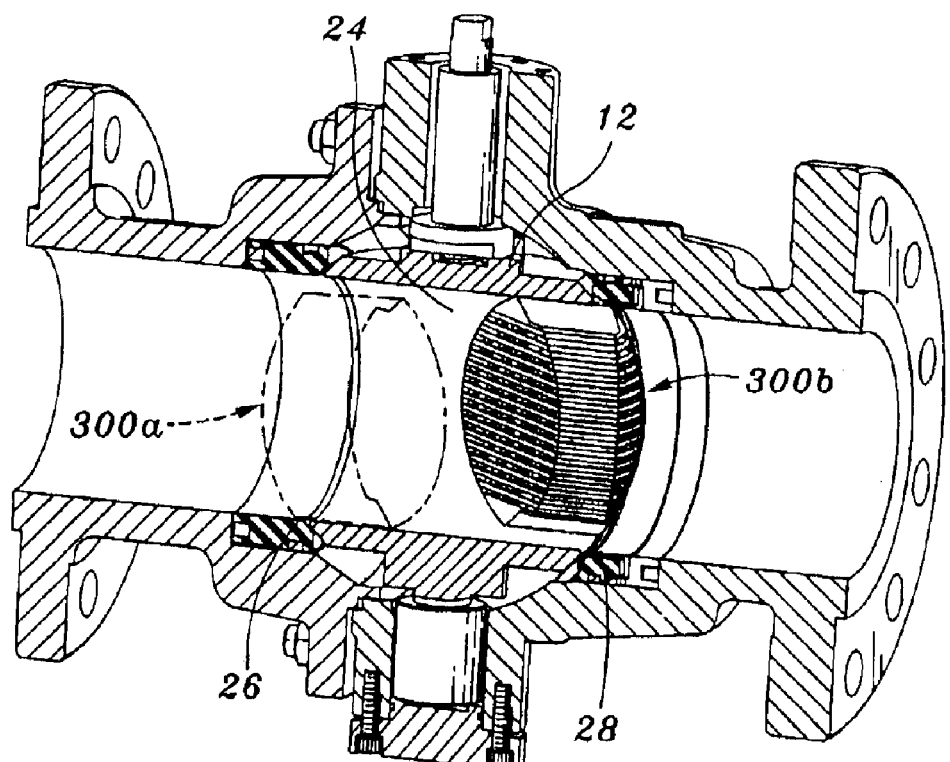
FIG. 37 is a side cross-sectional view of the closure element including a spaced pair of impedance assemblies which each have the structural attributes of the impedance assembly of the fifth embodiment.
Figure 38:
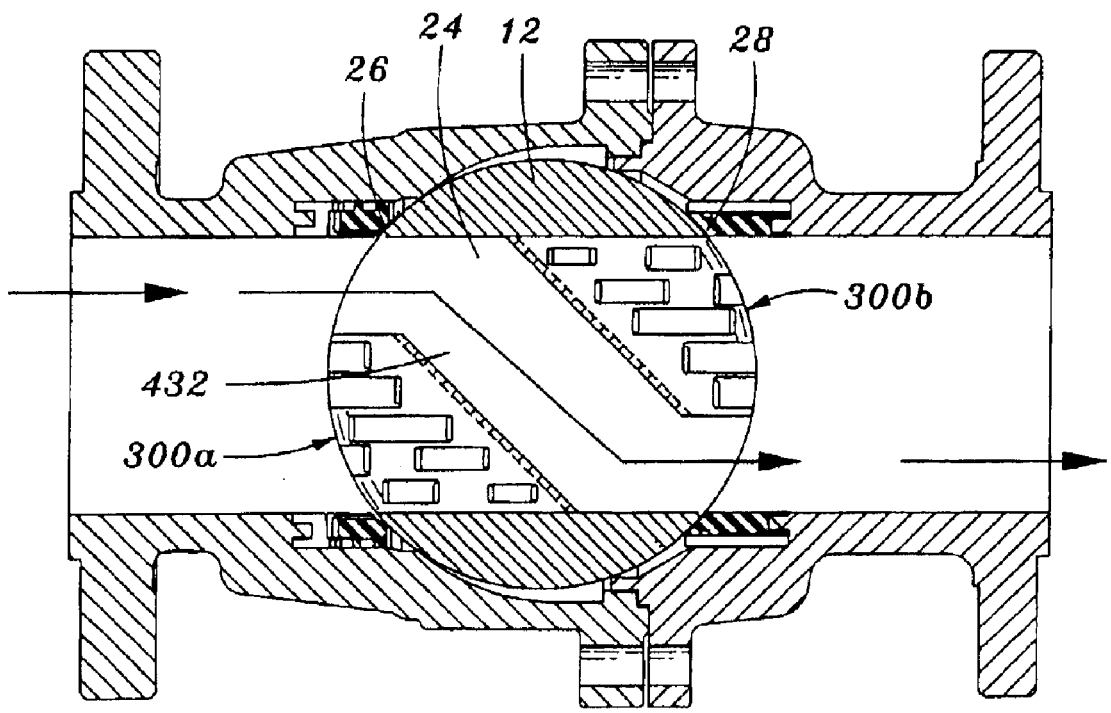
FIG. 38 is a top cross-sectional view of the closure element including the spaced pair of impedance assemblies shown in FIG. 37.

Referring now to FIGS. 37 and 38, further in accordance with the present invention, it is contemplated that a pair of the impedance assemblies 300 of the fifth embodiment may be mounted into the bore 24 of the closure element 12 in spaced relation to each other. More particularly, mounted within the bore 24 is a front or upstream impedance assembly 300a and a rear or downstream impedance assembly 300b which are disposed in spaced relation to each other. The downstream impedance assembly 300b is structurally identical to the impedance assembly 300, and mounted within the bore 24 of the closure element 12 in the same orientation shown and described above in relation to the impedance assemblies 300 and 200. The upstream impedance assembly 300a is also identically configured to the impedance assembly 300, except that the aforementioned beveled and arcuately contoured surfaces are included thereon in a manner which allows for the mounting thereof into the bore 24 in the same manner shown and described above in relation to the impedance assembly 80 of the third embodiment. Advantageously, the split arrangement of the upstream and downstream impedance assemblies 300a, 300b effectively "balances" the closure element 12 as the same is rotated between its fully open and fully closed positions. As will be recognized, those embodiments described above wherein the impedance assembly 80 extends only to the inflow end 26 of the bore 24 and the impedance assemblies 200, 300 extend to only the outflow end 28 of the bore 24 give rise to susceptibility for an unbalanced condition within the closure element 12 attributable to the weight of the impedance assembly 80, 200, 300 being offset from the rotational axis of the closure element 12.

As best seen in FIG. 38, the upstream and downstream impedance assemblies 300a, 300b and portions of the inner surface of the closure element 12 defining the bore 24 thereof collectively define a tortuous flow opening 432 which defines two turns. It is contemplated that the upstream and downstream impedance assemblies 300a, 300b will be configured in a manner wherein no unimpeded flow of fluid may occur through the flow opening 432 during any stage of the rotation of the closure element 12 between its fully open and fully closed positions. Those of ordinary skill in the art will recognize that the closure element 12 may be outfitted with impedance assemblies in a split arrangement having configurations differing from the impedance assembly 300. For example, tortuous passageways of the upstream and downstream impedance assemblies 300a, 300b may each be configured to provide an identical number of turns (e.g., four turns) or differing numbers of turns (i.e., the number of turns provided by each of the tortuous passageways of the upstream impedance assembly 300a could be greater or less than the number of turns defined by each of the tortuous passageways of the downstream impedance assembly 300b). Along these lines, it is further contemplated that tortuous passageways of the upstream and downstream impedance assemblies 300a, 300b may be formed in any of a large variety of configurations, depending on the pressure reduction characteristics desired in relation thereto. In this regard, the tortuous passageways may also be configured to be "reversible" to accommodate backflow through the upstream and downstream impedance assemblies 300a, 300b, i.e., flow which first passes through the downstream impedance assembly 300b and thereafter through the upstream impedance assembly 300a. It will be recognized that the tortuous passageways of the impedance assemblies of the prior embodiments discussed above may also be configured to accommodate such bi-directional flow.

The upstream and downstream impedance assemblies 300a, 300b are secured within the bore 24 of the closure element 12 through the use of welds in the same manner described above in relation to the impedance assemblies 80, 200, 300. As in such prior embodiments, the upstream impedance assembly 300a may be configured such that the tortuous passageways thereof are completely upstream of the axis of rotation of the closure element 12 or, alternatively, such that portions of the tortuous passageways extend downstream of the axis of rotation. Similarly, the downstream impedance assembly 300b may be configured such that the entirety of the tortuous passageways thereof are downstream of the axis of rotation of the closure element 12 or, alternatively, such that portions of the tortuous passageways extend upstream of the axis of rotation.

Figure 39:
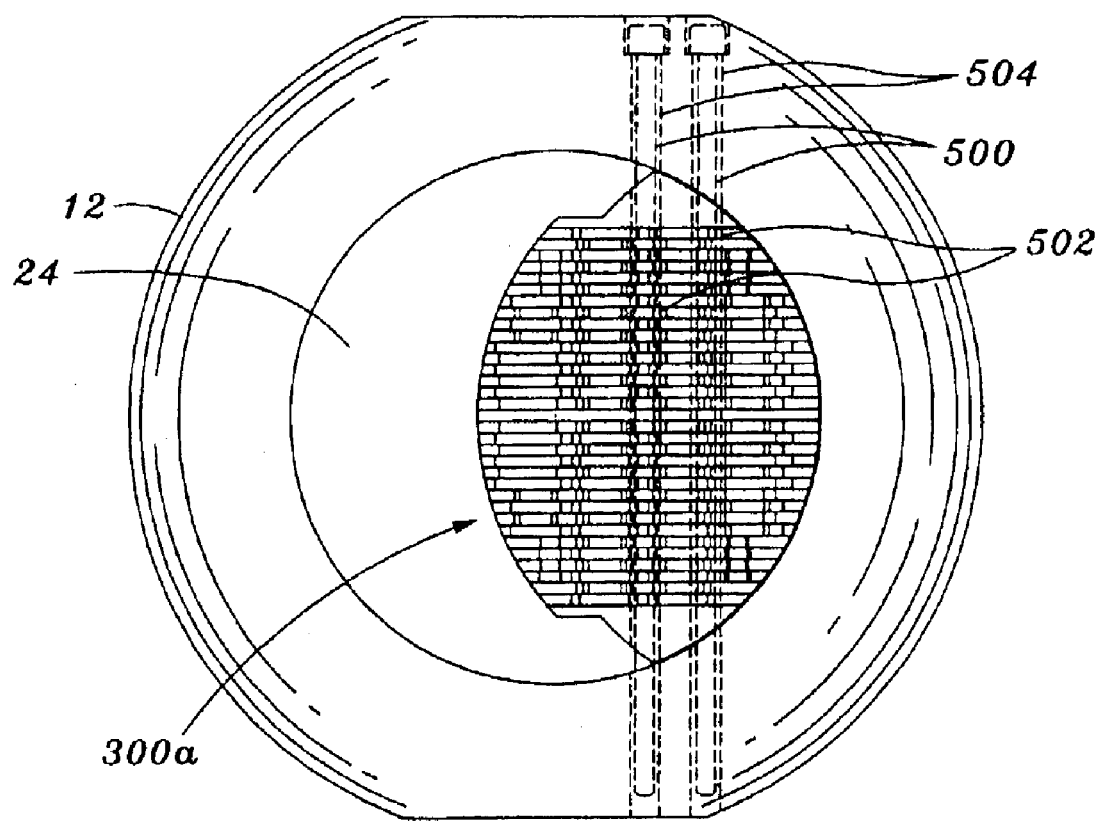
FIG. 39 is a front elevational view of the closure element and one of the impedance assemblies, illustrating reinforcement bolts which may be used to strengthen the connection between the impedance assemblies and the closure element.

Referring now to FIG. 39, further in accordance with the present invention, it is contemplated that the strength of engagement between the upstream and downstream impedance assemblies 300a, 300b and closure element 12 can be substantially enhanced through the use of a series of reinforcement bolts 500. In this regard, each of the upstream and downstream impedance assemblies 300a, 300b may each be provided with a plurality of elongate apertures 502 extending longitudinally therethrough. As will be recognized, such apertures 502 are collectively defined by sets of coaxially aligned apertures disposed within the individual stacked plates of the upstream and downstream impedance assemblies 300a, 300b. When the upstream and downstream impedance assemblies 300a, 300b are properly mounted within the bore 24 of the closure element 12, the apertures 502 thereof extend in spaced, generally parallel relation to the rotational axis of the closure element 12, and in coaxial alignment with respective ones of corresponding apertures 504 disposed within the closure element 12 itself. The bolts 500 are advanced through respective ones of the coaxially aligned sets of apertures 500, 504. The apertures 504 within the closure element 12 are each preferably provided with counterbores so that neither the heads of the bolts 50 nor nuts applied to the opposite ends thereof protrude from the arcuate outer surface of the closure element 12. As will be recognized, the bolts 500 effectively prevent any plate of the upstream and downstream impedance assemblies 300a, 300b from being dislodged from the stacked arrangement in the event of the failure of the corresponding welded or brazed connections. Though not shown, it is contemplated that supplemental reinforcement bolts may also be included which are advanced through only the upstream and downstream impedance assemblies 300a, 300b, and not the closure element 12. The use of the reinforcement bolts 500 and/or supplemental reinforcement bolts is also applicable to prior embodiments of the present invention.

Advantageously, the use of the reinforcement bolts 500 and/or supplemental reinforcement bolts described above allows the upstream and downstream impedance assemblies 300a, 300b to each be fabricated in separate and smaller sections or segments which are thereafter bolted together to make the final assembly. This particular approach may be necessary in the fabrication of larger valves. This approach also alleviates the cost of the process of using wire EDM to facilitate the fabrication of the impedance assembly 300a, 300b as described above in relation to prior embodiments of the present invention. Though the top and bottom end plates of each impedance assembly 300a, 300b may still be subjected to a wire EDM process to match the bore 24 of the closure element 12, the midsection of each impedance assembly 300a, 300b (the brazed disk plates) need not be subjected to a wire EDM process. In this regard, disk plates may each be laser cut to the final shape such that when brazed and bolted to each other, they conform to the curvature of the inner surface defining the bore 24 of the closure element 12. Additionally, the bolting option allows for the optional fabrication of the end plates of the impedance assemblies 300a, 300b in several segments along the direction of fluid flow. Since the wire EDM process is typically limited to approximately eighteen inches in length, disk stacks for valves larger than approximately sixteen inches would exceed this limit. By segmenting the end plates, each segment can be kept under eighteen inches in length and thereafter bolted in the above-described manner. Thus, the bolting option, in addition to increasing the overall strength of the impedance assemblies 300a, 300b, further reduces handling and brazing problems by allowing for the fabrication of separate segments which are subsequently secured to each other, eliminates many of the costs associated with the wire EDM process, and overcomes length limitations associated with the wire EDM process.

Additional modifications and improvements of the present invention may also be apparent to those of ordinary skill in the art. For example, as shown in the accompanying figures, the impedance assembly 80 of the third embodiment is formed to have a generally elliptical configuration, which results in the flow opening 118 being generally crescent-shaped when the impedance assembly 80 is advanced into the bore 24 of the closure element 12. In this regard, the impedance assembly 80 may be formed to have alternative shapes as would cause the flow opening 118 to have a shape other than a crescent shape. More particularly, the shape of the flow opening 118 can be varied by modifying the shape of the impedance assembly 80, with the shape of the flow opening 118 being selected to provide a desired flow curve characteristic. The same holds true for the shape of the impedance assembly 200 and resultant shape of the flow opening 232. Additionally, it is contemplated that the impedance assembly 200 may be sized and configured so as to completely cover or extend across the bore 24 of the closure element 12, i.e., the flow opening 232 is not defined. Thus, the particular combination of parts described and illustrated herein is intended to represent only certain embodiments of the present invention, and is not intended to serve as limitations of alternative devices within the spirit and scope of the invention.

What is claimed:

1. A valve assembly, comprising:
   a rotary closure element defining an axis of rotation and selectively movable between a fully open position and a fully closed position;
   upstream and downstream impedance assemblies mounted to and movable with the rotary closure element, the upstream and downstream impedance assemblies each defining an inflow end and an outflow end, and comprising:
      a plurality of fluid passageways of varying noise attenuating capability extending from the inflow end to the outflow end, at least some of the fluid passageways being tortuous and defining a series of turns which extend at generally right angles relative to each other;
   the upstream and downstream impedance assemblies and the closure element collectively defining a flow opening which extends from the inflow end of the upstream impedance assembly to the outflow end of the downstream impedance assembly.

2. The valve assembly of claim 1 wherein:
   the upstream impedance assembly is configured and oriented relative to the closure element such that the fluid passageways thereof are each upstream of the axis of rotation when the closure element is in the fully open position; and
   the downstream impedance assembly is configured and oriented relative to the closure element such that the fluid passageways thereof are each downstream of the axis of rotation when the closure element is in the fully open position.

3. The valve assembly of claim 1 wherein:
   the upstream impedance assembly is configured and oriented relative to the closure element such that certain ones of the fluid passageways thereof include portions which are downstream of the axis of rotation when the closure element is in the fully open position; and
   the downstream impedance assembly is configured and oriented relative to the closure element such that certain ones of the fluid passageways thereof include portions which are upstream of the axis of rotation when the closure element is in the fully open position.

4. The valve assembly of claim 1 wherein the fluid passageways of the upstream and downstream impedance assemblies define the same number of turns.

5. The valve assembly of claim 1 wherein:
   the outflow end of the upstream impedance assembly has a beveled configuration; and
   the inflow end of the downstream impedance assembly has a beveled configuration.

6. The valve assembly of claim 1 further comprising at least two reinforcement bolts which are each secured to the rotary closure element and advanced through respective ones of the upstream and downstream impedance assemblies.

7. A valve assembly, comprising:
   a rotary closure element defining an axis of rotation and selectively movable between a fully open position and a fully closed position;
   upstream and downstream impedance assemblies mounted to and movable with the rotary closure element, the upstream and downstream impedance assemblies each defining an inflow end and an outflow end, and comprising:
      a plurality of noise attenuating fluid passageways extending from the inflow end to the outflow end, at least some of the fluid passageways being tortuous and defining a series of turns which extend at generally right angles relative to each other;
   the upstream and downstream impedance assemblies and the closure element collectively defining a flow opening which extends from the inflow end of the upstream impedance assembly to the outflow end of the downstream impedance assembly.

8. The valve assembly of claim 7 wherein:
   the upstream impedance assembly is configured and oriented relative to the closure element such that the fluid passageways thereof are each upstream of the axis of rotation when the closure element is in the fully open position; and the downstream impedance assembly is configured and oriented relative to the closure element such that the fluid passageways thereof are each downstream of the axis of rotation when the closure element is in the fully open position.

9. The valve assembly of claim 7 wherein:

the upstream impedance assembly is configured and oriented relative to the closure element such that certain ones of the fluid passageways thereof include portions which are downstream of the axis of rotation when the closure element is in the fully open position; and the downstream impedance assembly is configured and oriented relative to the closure element such that certain ones of the fluid passageways thereof include portions which are upstream of the axis of rotation when the closure element is in the fully open position.

10. The valve assembly of claim 7 wherein the fluid passageways of the upstream and downstream impedance assemblies define the same number of turns.

11. The valve assembly of claim 7 wherein:

the outflow end of the upstream impedance assembly has a beveled configuration; and the inflow end of the downstream impedance assembly has a beveled configuration.

12. The valve assembly of claim 7 further comprising at least two reinforcement bolts which are each secured to the rotary closure element and advanced through respective ones of the upstream and downstream impedance assemblies.

* * * * *